(12) United States Patent
Tokita et al.

(10) Patent No.: US 10,949,823 B2
(45) Date of Patent: *Mar. 16, 2021

(54) INFORMATION PROCESSING SYSTEM, INFORMATION PROCESSING APPARATUS, METHOD AND PROGRAM

(71) Applicant: Sony Corporation, Tokyo (JP)

(72) Inventors: Megumi Tokita, Kanagawa (JP); Tsuyoshi Nakayama, Kanagawa (JP); Yoshimasa Tai, Kanagawa (JP); Kaori Ando, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 15/231,427

(22) Filed: Aug. 8, 2016

(65) Prior Publication Data

US 2016/0350733 A1    Dec. 1, 2016

Related U.S. Application Data

(63) Continuation of application No. 14/266,292, filed on Apr. 30, 2014, now Pat. No. 9,489,665, which is a
(Continued)

(30) Foreign Application Priority Data

Mar. 4, 2003    (JP) .............................. JP2003-057396

(51) Int. Cl.
*G06F 21/00*    (2013.01)
*G06Q 20/12*    (2012.01)
*G06Q 30/06*    (2012.01)

(52) U.S. Cl.
CPC ....... *G06Q 20/1235* (2013.01); *G06Q 20/123* (2013.01); *G06Q 30/06* (2013.01);
(Continued)

(58) Field of Classification Search
CPC ................................................... G06Q 30/0601
(Continued)

(56) References Cited

U.S. PATENT DOCUMENTS 6,223,226 B1    4/2001    Miyahara
6,226,618 B1    5/2001    Downs et al.
(Continued)

FOREIGN PATENT DOCUMENTS

EP    1085443 A2 *    3/2001    ............. H04L 67/18
EP    1439450 A2 *    7/2004    ............. G06Q 30/06
(Continued)

OTHER PUBLICATIONS

USPTO. Technological Protection Systems for Digitized Copyrighted Works: A Report to Congress. (Nov. 2, 2002). Retrieved online Nov. 16, 2020. https://www.uspto.gov/sites/default/files/web/offices/dcom/olia/teachreport.pdf (Year: 2002).*
(Continued)

*Primary Examiner* — James A Reagan
(74) *Attorney, Agent, or Firm* — Xsensus LLP

(57) ABSTRACT

An information processing system, apparatus, method, and medium in which the purchase of content is facilitated. When a device to which content data is downloaded and a device for giving an instruction to purchase the content data are different, a purchase form for purchasing the content data is sent to the device giving an instruction to purchase the content data. The user ID and password are input into the purchase form, and the device to which the content data is downloaded, is determined by the user ID. If the device to which the content data is downloaded cannot be specified because the user registers a plurality of devices, a destination determination form specifying the device to which the
(Continued)

content data is downloaded, is sent. The content data is then distributed to the device indicated in the destination determination form.

15 Claims, 33 Drawing Sheets

Related U.S. Application Data continuation of application No. 10/512,813, filed as application No. PCT/JP2004/002650 on Mar. 3, 2004, now Pat. No. 8,768,841.

(52) U.S. Cl.
CPC ..... *G06Q 30/0601* (2013.01); *G06Q 30/0633* (2013.01); *G06Q 2220/18* (2013.01)

(58) Field of Classification Search
USPC .................................................. 705/59, 50
See application file for complete search history.

(56) References Cited

U.S. PATENT DOCUMENTS

| 6,411,684 | B1 | 6/2002 | Cohn et al. |
| 6,732,106 | B2* | 5/2004 | Okamoto ................ G06F 21/10 705/50 |
| 7,209,892 | B1 | 4/2007 | Galuten et al. |
| 8,768,841 | B2* | 7/2014 | Tokita .................... G06Q 30/06 380/201 |
| 2002/0010681 | A1* | 1/2002 | Hillegass ................ G06F 21/10 705/59 |
| 2002/0120925 | A1 | 8/2002 | Logan |
| 2002/0194616 | A1* | 12/2002 | Brodigan ............ H04N 7/17354 725/119 |
| 2003/0014630 | A1 | 1/2003 | Spencer et al. |
| 2003/0023427 | A1* | 1/2003 | Cassin ................ H04N 7/17318 704/201 |
| 2003/0028592 | A1 | 2/2003 | Oho et al. |
| 2003/0028597 | A1* | 2/2003 | Salmi .................. G06F 21/6245 709/204 |
| 2003/0048907 | A1* | 3/2003 | Nakahara ................ G06F 21/10 380/277 |
| 2003/0115144 | A1* | 6/2003 | Stefik ..................... G06F 21/10 705/51 |
| 2004/0054678 | A1* | 3/2004 | Okamoto ................ G06F 21/10 |
| 2005/0004875 | A1 | 1/2005 | Kontio et al. |
| 2005/0066353 | A1* | 3/2005 | Fransdonk ............ H04L 63/083 725/29 |
| 2007/0250194 | A1* | 10/2007 | Rhoads .............. G06Q 30/0277 700/94 |
| 2008/0147530 | A1* | 6/2008 | Kwan ................ G06Q 30/0601 705/34 |

FOREIGN PATENT DOCUMENTS

| JP | 11-15927 | | 1/1999 | |
| JP | 2000-306003 | | 11/2000 | |
| JP | 2001-7856 | | 1/2001 | |
| JP | 2001-7857 | | 1/2001 | |
| JP | 2001-154958 | | 6/2001 | |
| JP | 2001-297136 | | 10/2001 | |
| JP | 2002-44641 | | 2/2002 | |
| JP | 2002-73920 | | 3/2002 | |
| JP | 2002-135700 | | 5/2002 | |
| JP | 2002135700 | A | 5/2002 | |
| JP | 2002135700 | A * | 5/2002 | ............... H04N 5/76 |
| JP | 2002-163178 | | 6/2002 | |
| JP | 2002-163467 | | 6/2002 | |
| JP | 2002-268968 | | 9/2002 | |
| JP | 2002-342592 | | 11/2002 | |
| JP | 2002-352103 | | 12/2002 | |

OTHER PUBLICATIONS

Clint P. Garrison. Digital Forensics for Network, Internet, and Cloud Computing. (Jun. 15, 2000). Retrieved online Nov. 16, 2020. http://index-of.es/Forensic/Syngress.Digital.Forensics.for.Network. Internet.and.Cloud.Computing.pdf (Year: 2000).*
White, Ron; "How Computers Work", Millennium Ed., Que Corporation, Indianapolis, IN, 1999.
How Networks Work, Millennium Edition. Derfler, Frank and Les Freed. Que Corporation, 2000. ISBN 0-7897-2445-6. Entire work cited.
How Computers Work, 6$^{th}$ Edition. White, Ron. Que Corporation, 2002. ISBN 0-7897-2549-5. Entire work cited.
Building CyberStores. Nemzow, Martin. McGraw-Hill, New York, 1997. ISBN 0-07-913090-9 Front matter, pp. 436-455 included.

* cited by examiner

CELLULAR TELEPHONE 13

FIG. 11

| DEVICE ID | USER ID | PASSWORD | MAIL ADDRESS |
|---|---|---|---|
| 000001 | A I U | × × × × | △△△@z.co.jp |
| 000002 | | | |
| 000003 | | | |
| ⋮ | ⋮ | ⋮ | ⋮ |
| 999999 | | | |

| DEVICE ID | ALIAS ID | USER ID | PASSWORD | MAIL ADDRESS |
|---|---|---|---|---|
| 000001 | ABCDEF | AIU | ×××× | △△△@z.co.jp |
| 000002 | ABCDEG | | | |
| 000003 | ABCDEH | | | |
| — — — | — — — | — — — | — — — | — — — |
| 999999 | | | | |

| USER ID | PASSWORD | MAIL ADDRESS | TERMINAL NAME (ALIAS ID) | DEVICE ID |
|---|---|---|---|---|
| AIU | ×××× | ΔΔΔ@z.co.jp | STB | 000001 |
| | | | PC | 010021 |
| KA KI KU | ○○○○ | Δ×Δ@x.co.jp | PERSONAL COMPUTER | 001234 |
| | | | STB | 001235 |
| | | | CELLULAR TELEPHONE | 001236 |
| ------ | ------ | ------ | ------ | ------ |

| CONTENT ID | SIZE | FEE | CONTENT |
|---|---|---|---|
| 1 | △ | □ | ............. |
| 2 | △ | □ | ............. |
| ⋮ | ⋮ | ⋮ | ⋮ |

| LICENSE ID | CONTENT ID | USAGE CONDITION |
|---|---|---|
| 1 | 1 | ---------- |
|  | 2 |  |
|  | ⋮ |  |
| 2 |  | ---------- |
|  |  |  |
|  | ⋮ |  |
| ⋮ | ⋮ | ⋮ |

| TRANSACTION ID | CONTENT ID | LICENSE ID | DESTINATION DEVICE ID | BILLING USER ID | DISTRIBUTION TIME | DISTRIBUTION STATUS |

FIG. 31

USER ID
[            ]

PASSWORD
[            ]

⦿ IS IT FOR PRESENT?

MAIL ADDRESS OF USER TO RECEIVE PRESENT
[            ]

TIME AND DATE YOU WISH TO DELIVER PRESENT
[ MONTH  DAY  HOUR  MINUTE ]

YOU HAVE CONTENT PRESENT FROM USER A

DO YOU WISH TO ACCEPT PRESENT?

○ YES　　○ NO

└─► PLEASE SELECT DEVICE BY WHICH
　　　YOU WISH TO RECEIVE PRESENT

○ PERSONAL COMPUTER

○ STB

○ CELLULAR TELEPHONE

301

INFORMATION PROCESSING SYSTEM, INFORMATION PROCESSING APPARATUS, METHOD AND PROGRAM

CROSS-REFERENCE TO RELATED APPLICATIONS

This document is a Continuation application of and is based upon and claims the benefit of priority under 35 U.S.C. § 120 from U.S. application Ser. No. 14/266,292, filed Apr. 30, 2014, herein incorporated by reference, which is a continuation application of U.S. Pat. No. 8,768,841, issued Jul. 1, 2014, herein incorporated by reference, which is a National Stage Application of International Application No. PCT/JP04/02650, filed Mar. 3, 2004, which claims the benefit of priority under 35 U.S.C. § 119 from Japanese Patent Application No. 2003-057396, filed Mar. 4, 2003.

TECHNICAL FIELD

The present invention relates to information processing systems, information processing apparatuses and methods, and programs. The invention relates to an information processing system, an information processing apparatus and method, and a program, which are suitable for purchasing content data.

BACKGROUND ART

Due to the recent widespread use of networks, such as the Internet, the purchasing of various goods (or following certain procedures for purchase) on networks is becoming common. There are various goods that can be purchased on a network, for example, not only tangible goods but also intangible goods. Intangible goods include, for example, music data and video data.

Some intangible goods can be obtained not only by being purchased, but also by being rented. Regardless of whether the user purchases or rents intangible goods, he/she can purchase desired content data, such as music data or video data, by using a computer at home without the need to go to music stores or rental stores for compact discs storing content data.

Unlike tangible goods, the intangible goods can be easily copied, and undesirable actions may occur, for example, copies of the intangible goods may be delivered from one purchaser to other persons. Generally, a mechanism for preventing such undesirable actions is contained in intangible goods.

For example, data concerning licenses (usage rights) is provided (sent) together with content data. By using such license data, the playback operation of content data provided to the user is managed, thereby preventing undesirable actions, such as copying.

When the user wishes to purchase content data via a network, he/she first accesses a site handling the content data via the network, and performs processing for purchasing the content data, such as inputting predetermined information, according to instructions from the site.

After completing the processing for purchasing the content data, the content data is downloaded from the site to a user device via the network. The downloaded content data is stored in a recording medium, such as a hard disk drive, in the device, together with license data.

After being downloaded to the user device, the license data is associated (bound) with ID information unique to the device storing the content data. Because of this association, even if the content data is copied, it can be prevented from being played back in a device other than the device which has downloaded the content data, i.e. a device that cannot associate its ID information with the license data.

In this manner, content data is downloaded to a device in which purchase processing was performed and is played back by this device. Accordingly, when the user purchases content data by using a device other than a device at home when he/she is away, he/she cannot play back the purchased content data by using the device at home.

In other words, the user cannot perform processing for storing desired content data in the device at home by using a different device when, for example, the user is away from home. Accordingly, the user cannot purchase content data by using a device different from the device used for playing back the content data.

DISCLOSURE OF INVENTION

In view of the above background, it is an object of the present invention to enable a user to perform processing for purchasing content data by using a device different from a device to play back the content data.

A first information processing apparatus of an information processing system of the present invention includes: first management means for managing a first ID for identifying the content; second management means for managing a second ID for identifying the third information processing apparatus; supply means for supplying the first ID managed by the first management means to the second information processing apparatus in response to a request to distribute the content from the second information processing apparatus; and distribution means for specifying, when receiving the first ID and information for specifying the second ID from the second information processing apparatus, the second ID managed by the second management means from the received information and for distributing the content identified by the first ID to the third information processing apparatus corresponding to the specified second ID. A second information processing apparatus includes: request means for requesting the first information processing apparatus to distribute the content; and sending means for sending the first ID corresponding to the content selected by a user from the first ID supplied from the supply means and for sending information for specifying the second ID in response to the request from the request means. A third information processing apparatus includes storage means for receiving and storing the content distributed by the distribution means.

An information processing apparatus of the present invention includes: first management means for managing a first ID for identifying a first apparatus; second management means for managing a second ID for identifying content; supply means for supplying the second ID managed by the second management means to a second apparatus in response to a request to distribute the content from the second apparatus; specifying means for specifying, when receiving the second ID and information for specifying the first ID from the second apparatus, the first ID managed by the first management means from the received information; and distribution means for distributing the content identified by the second ID to the first apparatus corresponding to the first ID specified by the specifying means.

The first management means may manage user information for identifying a user, a password, and the first ID in association with each other, and the specifying means may receive information containing at least one of the user information and the password as the information for specifying the first ID.

The information processing apparatus may further include scheduling means for forming, when the first ID is specified by the specifying means, a schedule for distributing the content identified by the second ID to the first apparatus corresponding to the specified first ID. The distribution means may distribute the content based on the schedule formed by the scheduling means.

The information processing apparatus may further include providing means for providing, when the schedule for the first apparatus is formed by the scheduling means, the schedule to the first apparatus in response to a request to provide the schedule from the first apparatus.

An information processing method of the present invention includes: a first management step of managing a first ID for identifying a first apparatus; a second management step of managing a second ID for identifying content; a supply step of supplying the second ID managed by processing of the second management step to a second apparatus in response to a request to distribute the content from the second apparatus; a specifying step of specifying, when receiving the second ID and information for specifying the first ID from the second apparatus, the first ID managed by processing of the first management step from the received information; and a distribution control step of controlling the distribution of the content identified by the second ID to the first apparatus corresponding to the first ID specified by processing of the specifying step.

A program in a recording medium of the present invention includes: a first management step of managing a first ID for identifying a first apparatus; a second management step of managing a second ID for identifying content; a supply step of supplying the second ID managed by processing of the second management step to a second apparatus in response to a request to distribute the content from the second apparatus; a specifying step of specifying, when receiving the second ID and information for specifying the first ID from the second apparatus, the first ID managed by processing of the first management step from the received information; and a distribution control step of controlling the distribution of the content identified by the second ID to the first apparatus corresponding to the first ID specified by processing of the specifying step.

A program of the present invention allows a computer to execute: a first management step of managing a first ID for identifying a first apparatus; a second management step of managing a second ID for identifying content; a supply step of supplying the second ID managed by processing of the second management step to a second apparatus in response to a request to distribute the content from the second apparatus; a specifying step of specifying, when receiving the second ID and information for specifying the first ID from the second apparatus, the first ID managed by processing of the first management step from the received information; and a distribution control step of controlling the distribution of the content identified by the second ID to the first apparatus corresponding to the first ID specified by processing of said specifying step.

According to the present invention, even when a device for making a request to distribute content and a device for receiving and storing the content are different, the request is processed and content can be distributed to the designated device.

BRIEF DESCRIPTION OF THE DRAWINGS

FIG. 11 illustrates the data configuration of a destination table.

FIG. 14 illustrates another configuration of the destination table.

FIG. 18 illustrates another configuration of the destination table.

FIG. 20 illustrates data stored in a content database.

FIG. 21 illustrates data stored in a license issuer.

FIG. 22 illustrates schedule data.

FIG. 31 illustrates an example of the screen displayed on a display unit.

FIG. 32 illustrates an example of the screen displayed on a display unit.

FIG. 33 illustrates an example of the screen displayed on a display unit.

BEST MODE FOR CARRYING OUT THE INVENTION

Figure 1:
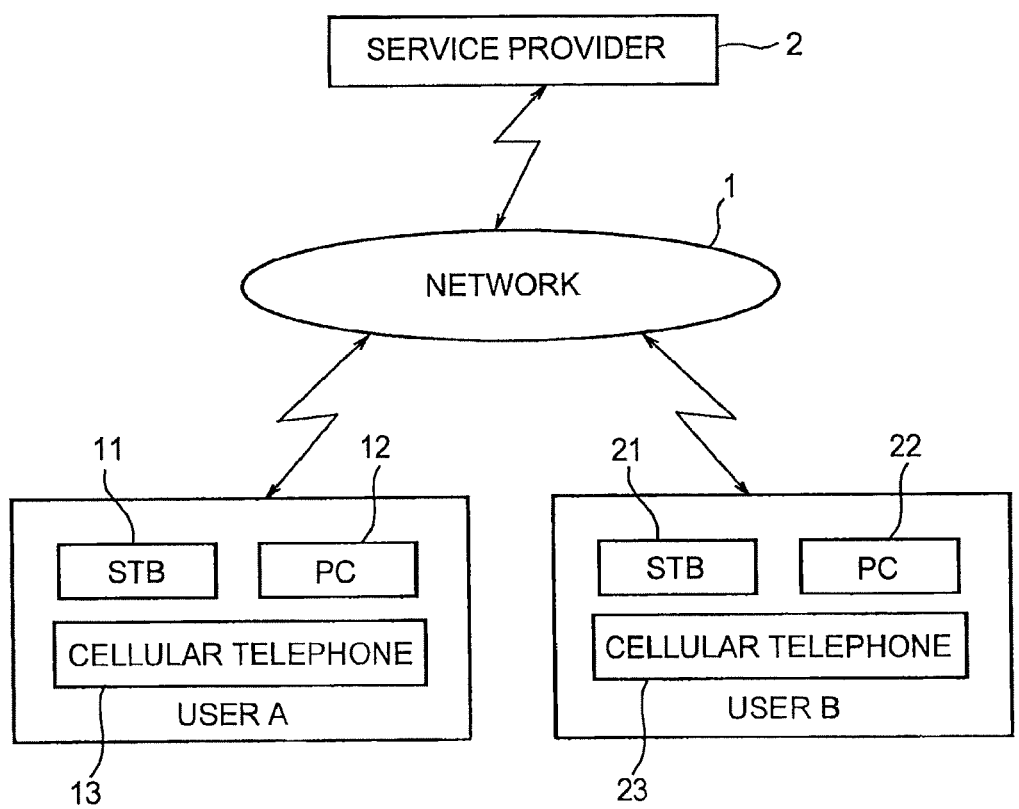
FIG. 1 is a diagram illustrating the configuration of an embodiment of an information processing system to which the present invention is applied.

An embodiment of the present invention is described below with reference to the accompanying drawings. FIG. 1 is a schematic diagram illustrating an embodiment of an information processing system integrating an information processing apparatus to which the present invention is applied. A network 1 is a network formed of the Internet or a LAN (Local Area Network). A service provider 2 is connected to the network 1.

In this embodiment, the service provider 2 is a provider for offering services for providing content data to user devices.

A user A owns a STB (Set Top Box) 11, a PC (Personal Computer) 12, and a cellular telephone 13 as devices which can be connected to the network 1. Similarly, a user B owns a STB 21, a PC 22, and a cellular telephone 23 as devices which can be connected to the network 1. The STBs 11 and 21 and the PCs 12 and 22 can be connected to the network 1 while they are installed in the user A's home and the user B's home, respectively. The cellular telephones 13 and 23 can be connected to the network 1 even when they are in a place away from the user A's home and the user B's home.

The basic configuration and functions of the STB 11 owned by the user A are similar to those of the STB 21 owned by the user B. The same applies to the PC 12 and the PC 22 owned by the user A and the user B, respectively, and the cellular telephone 13 and the cellular telephone 23 owned by the user A and the user B, respectively. For giving a description of these devices in the following specification, the STB 11, the PC 12, and the cellular telephone 13 are discussed by way of example, and a description of the STB 21, the PC 22, and the cellular telephone 23 is omitted, assuming that the same explanation applies to them, unless otherwise stated.

Figure 2:
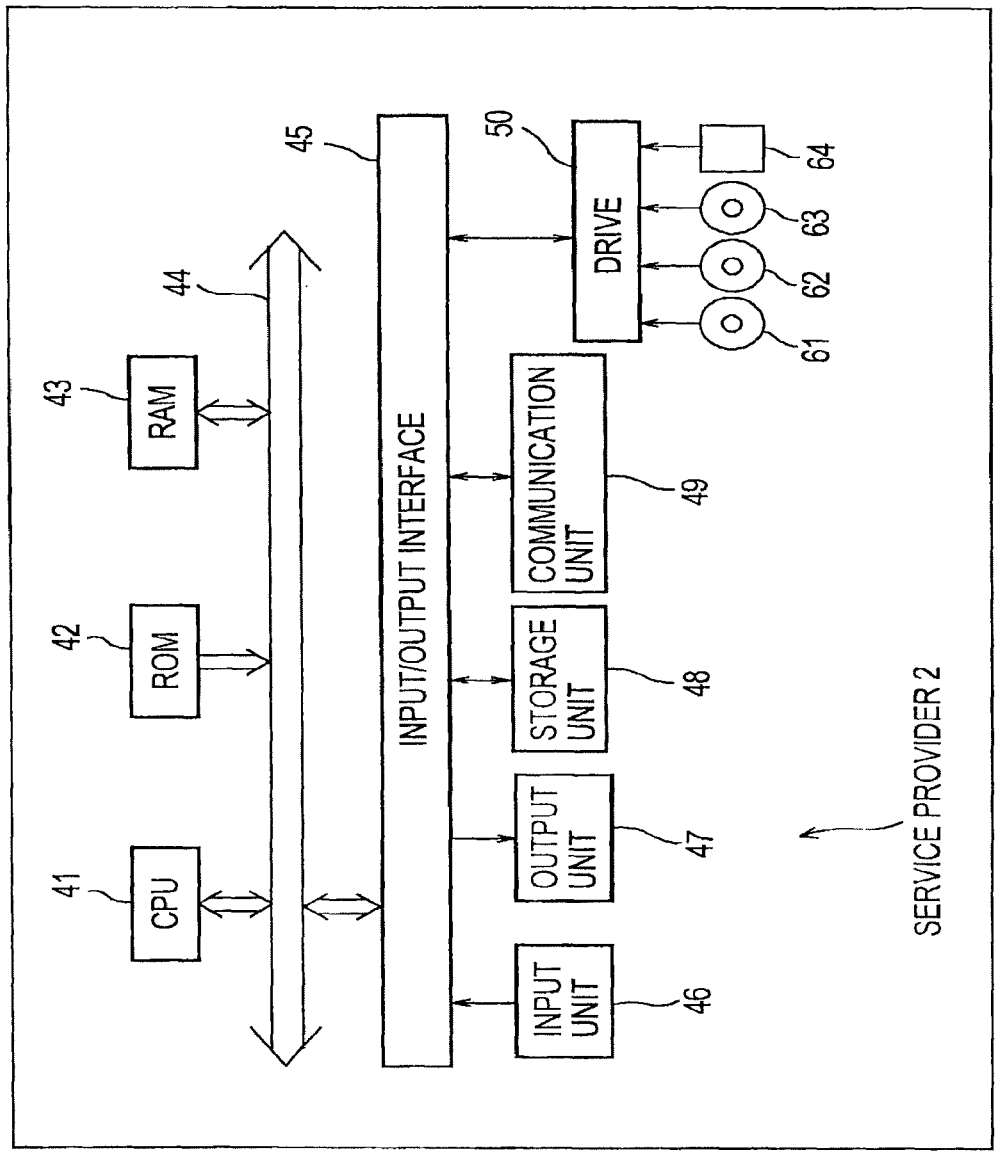
FIG. 2 is a block diagram illustrating an example of the configuration of a service provider.

FIG. 2 is a block diagram illustrating an example of the configuration of the service provider 2. The service provider 2 is formed of, for example, a computer. A CPU (Central Processing Unit) 41 of the service provider 2 executes various types of processing according to a program stored in a ROM (Read Only Memory) 42. In a RAM (Random Access Memory) 43, data and programs required for executing various types of processing by the CPU 41 are stored. An input unit 46 formed of, for example, a keyboard and a mouse, is connected to an input/output interface 45, and outputs a signal input into the input unit 46 to the CPU 41. An output unit 47 formed of, for example, a display and a speaker, is also connected to the input/output interface 45.

A storage unit 48 formed of, for example, a hard disk, and a communication unit 49 for sending and receiving data to and from another device (for example, the STB 11) via the network 1, such as the Internet, are also connected to the input/output interface 45. A drive 50 is used for reading and writing data from and into recording media, such as a magnetic disk 61, an optical disc 62, a magneto-optical disk 63, and a semiconductor memory 64.

Figure 3:
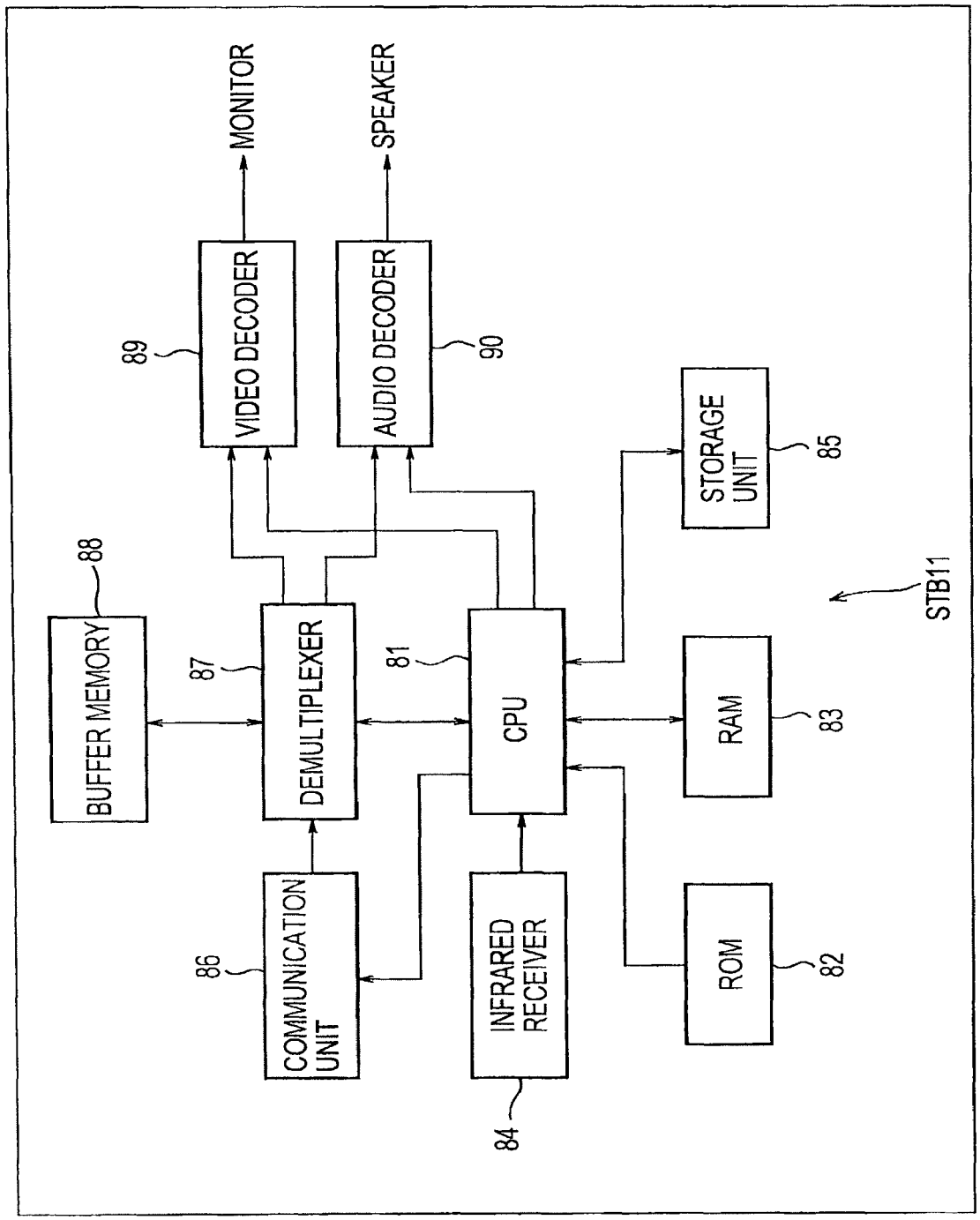
FIG. 3 is a block diagram illustrating an example of the configuration of an STB.

FIG. 3 illustrates an example of the internal configuration of the STB 11. A CPU 81 expands a control program stored in a ROM 82 into a RAM 83 so as to control the entire operation of the STB 11 based on an instruction from a user supplied from an infrared receiver 84.

For example, in response to an instruction from the user to display an EPG (Electronic Program Guide) on a monitor (not shown) connected to the STB 11, the CPU 81 executes processing for displaying an image on the monitor based on EPG data supplied from a demultiplexer 87.

The infrared receiver 84 receives infrared emitted from a remote controller (not shown) for the STB 11 and outputs a command corresponding to the user's instruction to the CPU 81.

A storage unit 85 stores information concerning programs for which record reservations or viewing reservations are made or information concerning an ID supplied from another device (in this case, the service provider 2). Based on an instruction from the CPU 81, a communication unit 86 extracts a predetermined channel signal, performs analog-to-digital conversion, QPSK (Quadrature Phase Shift Keying) demodulation, and error correction, and outputs a obtained transport stream to the demultiplexer 87 at the stage subsequent to the communication unit 86.

The communication unit 86 sends and receives data to and from the service provider 2 via the network 1 and also performs processing on the sending data and the received data.

The demultiplexer 87 temporarily stores a supplied transport stream in a buffer memory 88, and descrambles the transport stream by using a descramble key supplied from an IC card (not shown). The demultiplexer 87 then extracts packets forming video data of a program specified by the CPU 81 from the descrambled data based on the identifiers, and outputs the extracted packets to a video decoder 89. The demultiplexer 87 also extracts packets in which audio data of the program is stored, and outputs the extracted packets to an audio decoder 90.

The video decoder 89 plays back the supplied packets according to, for example, the MPEG (Moving Picture Experts Group)2 method, and supplies the played back video signal to a monitor (not shown) and displays it on the monitor. The audio decoder 90 similarly plays back the supplied packets, and supplies the played back audio signal to a speaker (not shown) and outputs it from the speaker.

Figure 4:
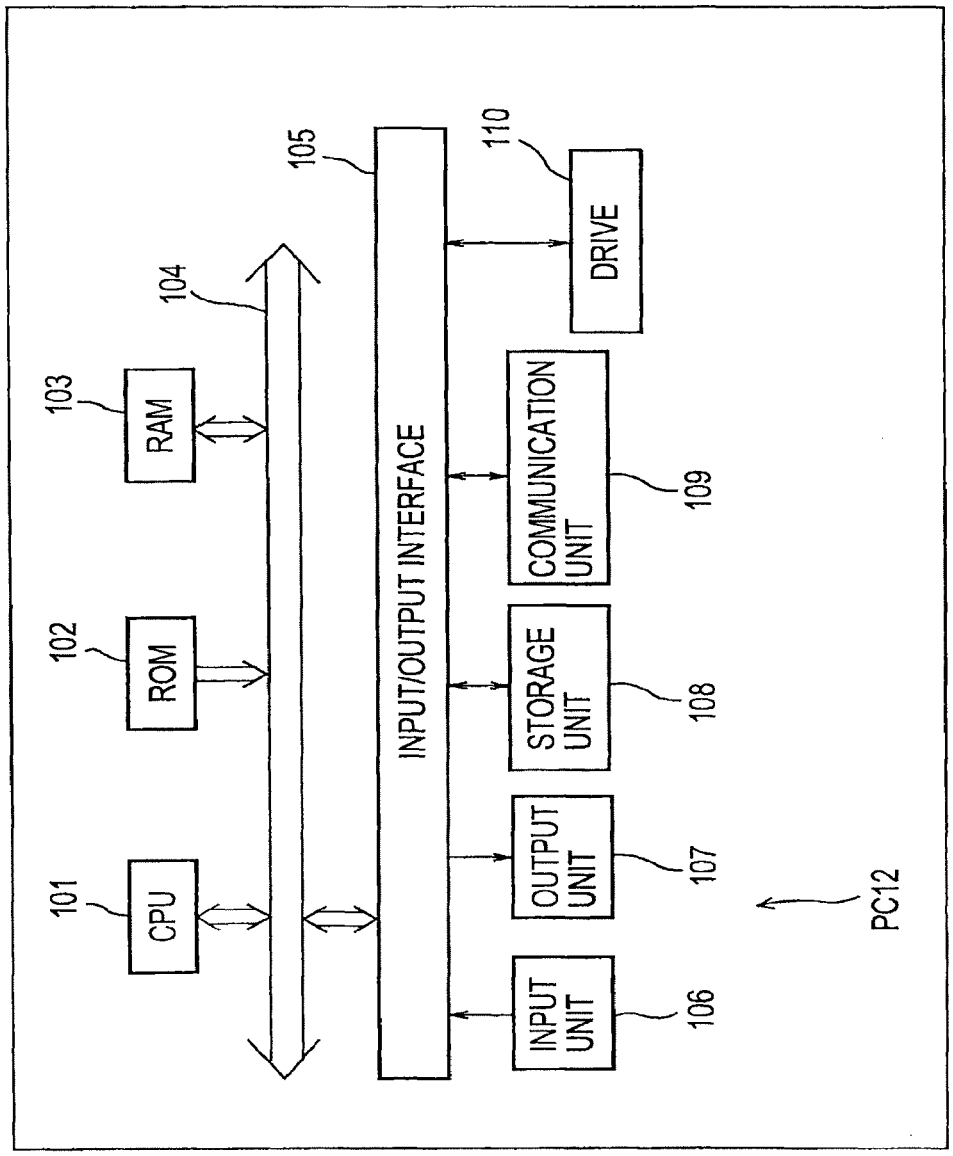
FIG. 4 is a block diagram illustrating an example of the configuration of a PC.

FIG. 4 is a block diagram illustrating an example of the internal configuration of the PC 12. A CPU 101 of the PC 12 executes various types of processing according to a program stored in a ROM 102. In a RAM 103, data and programs required for executing various types of processing by the CPU 101 are stored. An input unit 106 formed of, for example, a keyboard and a mouse, is connected to an input/output interface 105, and outputs a signal input into the input unit 106 to the CPU 101. An output unit 107 formed of, for example, a display and a speaker, is also connected to the input/output interface 105.

A storage unit 108 formed of, for example, a hard disk, and a communication unit 109 for sending and receiving data to and from another device (for example, the service provider 2) via the network 1, such as the Internet, are also connected to the input/output interface 105. A drive 120 is used for reading and writing data from and into a recording medium, for example, a magnetic disk.

Figure 5:
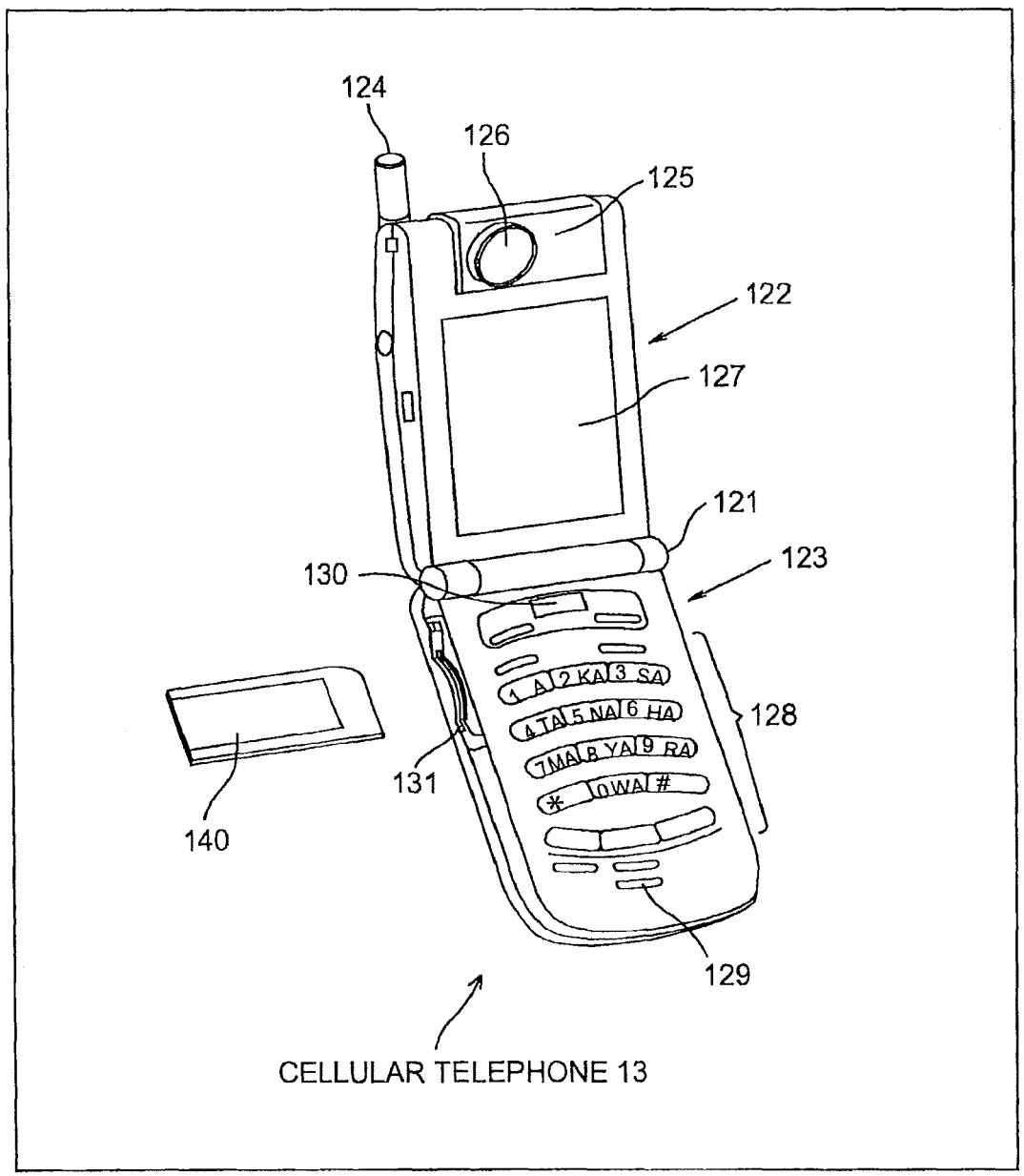
FIG. 5 is a diagram illustrating an example of the external configuration of a cellular telephone.

FIG. 5 illustrates an example of the external configuration of the cellular telephone 13. FIG. 5 shows that the cellular telephone 13 is divided into a display portion 122 and a main portion 123 across a center hinge 121, and can be folded at the hinge 121.

A transceiver antenna 124 is attached to the top left of the display portion 122 in the state in which it can be pulled out of and retracted into the display portion 122. Radio waves are transmitted and received via the antenna 124 to and from a base station for controlling the connection with the network 1. A camera unit 125 rotatable in the angle range of about 180 degrees is disposed at the top center of the display portion 122, and a desired image subject can be captured by a CCD camera 126 provided for the camera unit 125.

When the camera unit 125 is rotated, the CCD camera 126 disappears and a speaker (not shown) appears, and the user can listen to the voice on the telephone.

A liquid crystal display 127 is provided at the front side of the display portion 122, and displays, not only the reception status of radio waves, the remaining capacity of batteries, the names and telephone numbers registered in the address book, and the calling history, but also email messages, simplified homepages, and images captured by the CCD camera 126 of the camera unit 125.

On the obverse surface of the main portion 123, operation keys 128, such as numeric keys from 0 to 9, a calling key, a redial key, a hang-up/power key, a clear key, and an email key, are provided, and various instructions can be input by using the operation keys 128.

A microphone 129 is provided for the main portion 123, and user's voice on the telephone is collected by the microphone 129. A rotatable jog dial 130 is disposed above the operation keys 128 such that it slightly projects from the surface of the main portion 123. In accordance with the rotating operation on the jog dial 130, various operations, for example, scrolling of the address book list and email messages displayed on the liquid crystal display 127, page scrolling of simplified homepages, or forwarding of images, can be performed.

A Memory Stick® slot 131 for inserting a memory stick 140 (produced by Sony Corporation) that can be inserted/removed is provided at the top of the left side of the main portion 123. Email messages, simplified homepages, and images captured by the CCD camera 126 can be recorded in response to the user's operation.

Since the memory stick 140 can be inserted into the main portion 123, the cellular telephone 13 can share data with other electronic devices via the memory stick 140.

Figure 6:
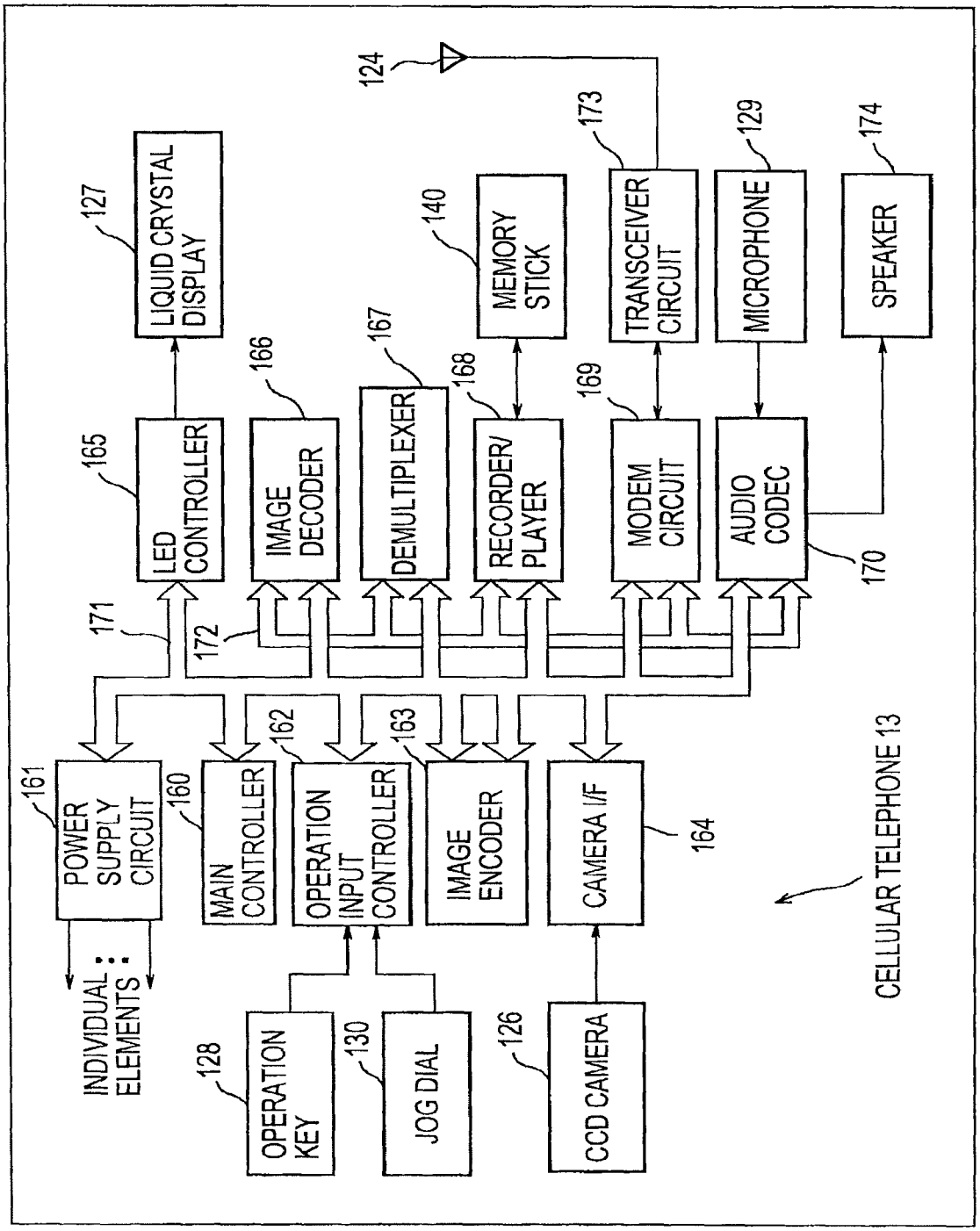
FIG. 6 is a diagram illustrating an example of the internal configuration of the cellular telephone.

In the cellular telephone 13, as shown in FIG. 6, a power supply circuit 161, an operation input controller 162, an image encoder 163, a camera interface 164, an LCD (Liquid Crystal Display) controller 165, an image decoder 166, a demultiplexer 167, a recorder/player 168, a modem circuit 169, and an audio codec 170 are connected to a main controller 160 for centrally controlling the elements of the display portion 122 and the main portion 123 via a main bus 171. Also, the image encoder 163, the image decoder 166, the demultiplexer 167, the modem circuit 169, and the audio codec 170 are connected to each other via a synchronizing bus 172.

When the hang-up/power key is turned ON by the user's operation, the power supply circuit 161 supplies power from a battery pack to the individual elements, thereby starting the cellular telephone 13.

Under the control of the main controller 160 formed of a CPU, a ROM, and a RAM, the cellular telephone 13 converts an audio signal collected by the microphone 129 during the audio conversation mode into digital audio data by the audio codec 170, performs spread spectrum on the digital audio data by using the modem circuit 169, performs digital-to-analog conversion and frequency conversion on the digital audio data by using a transceiver circuit 173, and then sends the resulting data via the antenna 124.

The cellular telephone 13 also amplifies a signal received by the antenna 124 during the audio conversation mode so as to perform frequency conversion and analog-to-digital conversion, performs de-spread spectrum by using the modem circuit 169, and converts the digital signal into an analog audio signal by using the audio codec 170, and then outputs the analog audio signal via a speaker 174.

When receiving data of a moving-picture file linked to a simplified homepage during the data communication mode, the cellular telephone 13 performs de-spread spectrum on a signal received from a base station via the antenna 124 by using the modem circuit 169, and sends the resulting multiplexed data to the demultiplexer 167.

The demultiplexer 167 demultiplexes the multiplexed data so as to divide it into coded image data and coded audio data. The demultiplexer 167 then supplies the coded image data to the image decoder 166 and also supplies the audio data to the audio codec 170 via the synchronizing bus 172.

The image decoder 166 decodes the coded image data according to a decoding method corresponding to the predetermined coding method, such as MPEG (Moving Picture Experts Group)2 or MPEG4 so as to generate playback moving picture data, and supplies the decoded image data to the liquid crystal display 127 via the LCD controller 165. Accordingly, moving picture data contained in the moving picture file linked to a simplified homepage can be displayed.

Simultaneously, the audio codec 170 converts the audio data into an analog audio signal and supplies it to the speaker 174. Accordingly, the audio data contained in the moving picture file linked to the simplified homepage can be played back.

The cellular telephone 13 can record data linked to a received simplified homepage on the memory stick 140 via the recorder/player 168 in response to a user's operation.

Figure 7:
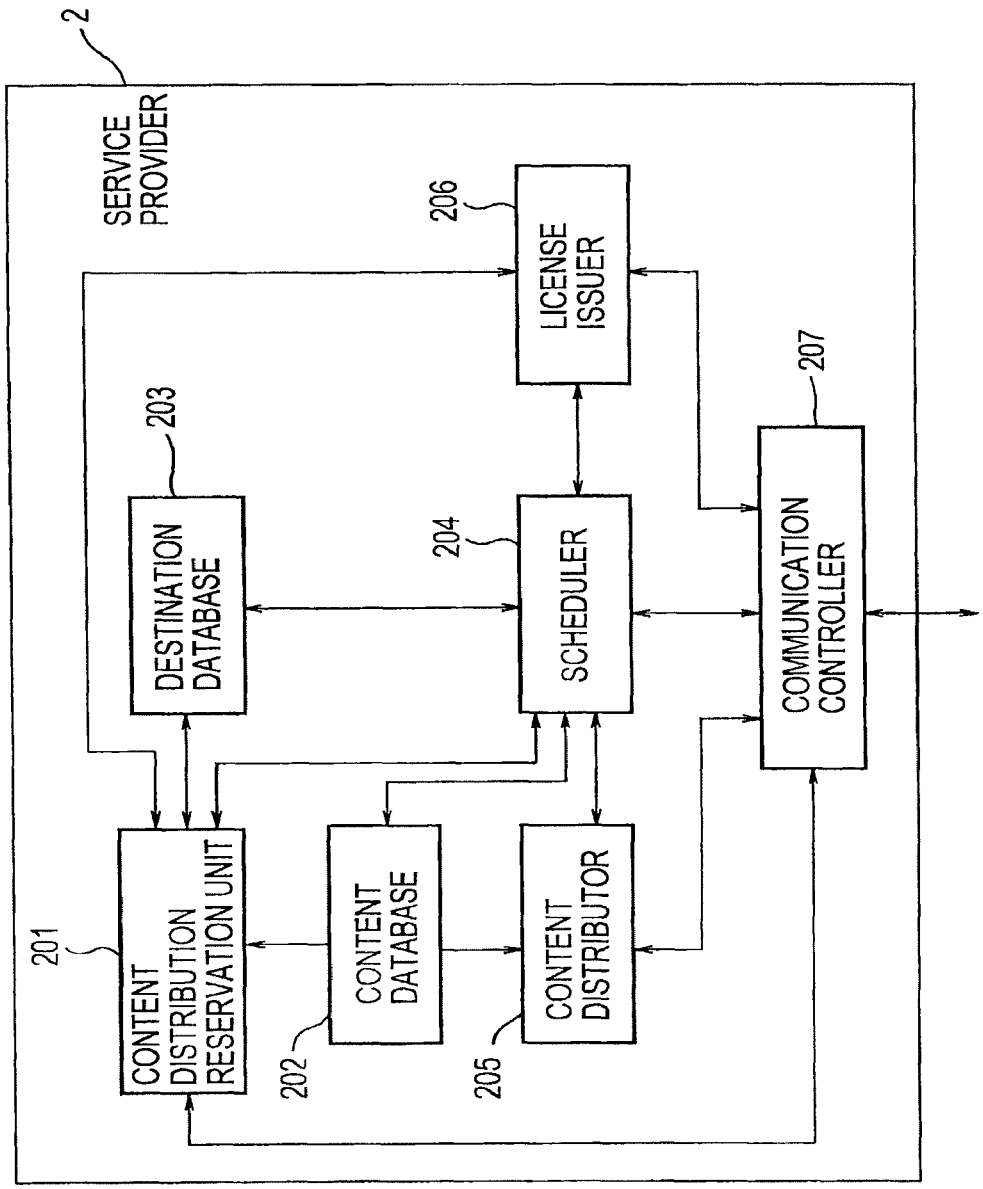
FIG. 7 is a block diagram illustrating the functions of the service provider.

In the individual devices having the above-described configurations, the functions for implementing this embodiment are described below. FIG. 7 is a functional block diagram of the service provider 2 illustrating the functions required for executing the processing described below.

A content-distribution reservation unit 201 accepts reservations or purchases for the distribution of content from users. A content database 202 stores data of the content itself (hereinafter sometimes referred to as "content data") and data concerning the content data (hereinafter sometimes referred to as "content accompanying data"), for example, the size and the effective period of the content data, so that the content data and the content accompanying data can be associated with each other.

A destination database 203 stores information concerning users (hereinafter sometimes referred to as "user information") who have made contract for the purchase of the content data. Upon receiving a request to reserve or purchase content data from a user, the content-distribution reservation unit 201 determines whether the request is to be accepted by referring to the content accompanying data stored in the content database 202 and the user information stored in the destination database 203. If the content-distribution reservation unit 201 determines that the request is to be accepted, it outputs predetermined information to a scheduler 204.

The content-distribution reservation unit 201 manages data concerning a site (homepage that can be browsed on the network 1) which accepts requests to reserve or purchase predetermined content from users, for example, the user A (FIG. 1), and provides such data to a user who has accessed the site. Then, the user can send a request to reserve or purchase content by checking the screen based on the data.

The scheduler 204 forms a distribution schedule indicating, for example, when content data requested by the user is provided to the user. Based on this schedule, a content distributor 105 reads content data from the content database 202 and sends it to a user device.

A license issuer 206 issues license data (usage right) for allowing the content data to be played back at the user side while preventing the unauthorized use of the content data, and adds the license data to the content data. A communication controller 207 controls the sending and receiving of data in the service provider 2 via the network 1.

The correlation between the service provider 2 shown in FIG. 2 and the service provider 2 shown in FIG. 7 is as follows. The content data 202 and the distribution database 203 are databases stored in the storage unit 48. The portion for storing the data concerning the site managed by the content-distribution reservation unit 201 may be disposed in the storage unit 48.

The content-distribution reservation unit 201, the scheduler 204, the content distributor 205, and the license issuer 206 are functions implemented by starting the corresponding programs stored in the ROM 42 or the storage unit 48 and by executing the processing by the CPU 41 according to the programs. Accordingly, the programs or data are expanded and stored in the RAM 43 if necessary.

The communication controller 207 is a function for controlling the sending and receiving of data performed by the communication unit 49.

Figure 8:
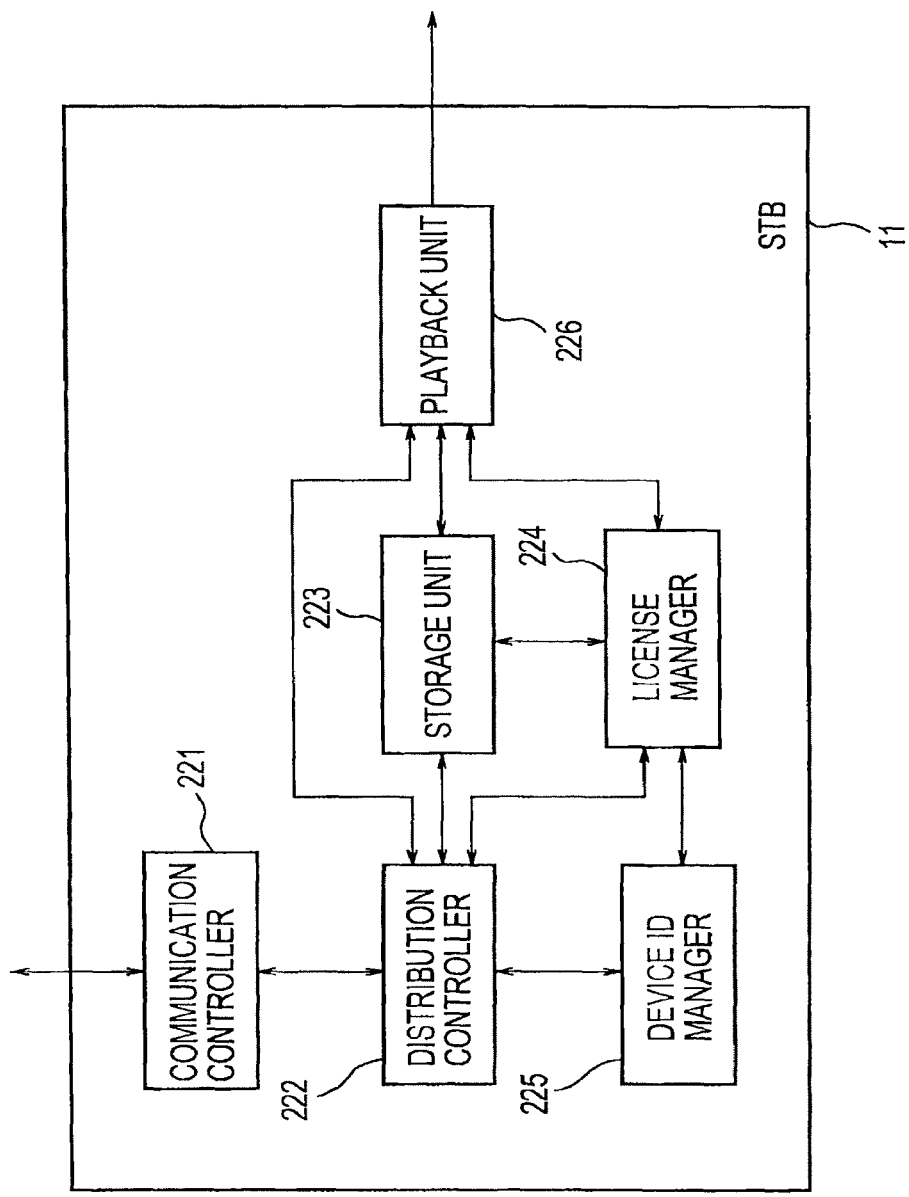
FIG. 8 is a block diagram illustrating the functions of the STB.

A description is now given of the functions of the STB 11 for sending and receiving data to and from the service provider 2 having the above-described functions. FIG. 8 is a functional block illustrating functions of the STB 11 required for sending and receiving data to and from the service provider 2 and for performing processing described below. A communication controller 221 controls the sending and receiving of data to and from the service provider 2 via the network 1. The data controlled by the communication controller 221 is supplied to a distribution controller 222.

The distribution controller 222 controls the sending and receiving of content data or distribution schedule data to and from the service provider 2. A storage unit 223 stores content data supplied from the distribution controller 222. A license manager 224 stores license data supplied from the distribution controller 222, and also manages the storage of content data in the storage unit 223 or the playback operation of content data in a playback unit 226 based on the stored license data.

A device ID manager 225 manages a device ID supplied from the service provider 2 as information for identifying the STB 11.

The correlation between the STB 11 shown in FIG. 3 and the STB 11 shown in FIG. 8 is as follows. The communication controller 221 is a function of controlling the communication in the communication unit 86. The storage unit 223, the portion of the license manager 224 for storing the license data, and the portion of the device ID manager 225 for storing the device ID are disposed in the storage unit 85.

The distribution controller 222, the license manager 224, and the device ID manager 225 are functions implemented by starting the corresponding programs stored in the ROM 82 or the storage unit 85 and by executing processing by the CPU 81 according to the programs. Accordingly, the programs or data are expanded and stored in the RAM 83 if necessary.

The playback unit 226 is a function executed by the portions related to the playback operation, such as the demultiplexer 87, the video decoder 89, and the audio decoder 90.

The sending and receiving of data performed by the service provider 2 and the STB 11 is discussed below. To download content data by the STB 11 from the service provider 2, it is necessary that the STB 11 (user A) has made contract with the service provider 2 (or an agent managing the service provider 2). A description is given below, assuming that a device ID for identifying the STB 11 is given from the service provider 2 by making contract with the service provider 2 and that the STB 11 is registered in the service provider 2 by receiving the device ID.

A process for registering the STB 11 in the service provider 2 is discussed below with reference to the flowchart of FIG. 9. In step S11, the STB 11 accesses the service provider 2. This access is made via the network 1 by performing a predetermined operation on the STB 11 by the user A.

Upon receiving an access request from the STB 11 in step S21, the service provider 2 sends data concerning a registration form in step S22. Before sending the data concerning the registration form, a determination may be made as to whether the STB 11 which has accessed the service provider 2 has already been registered, and if so, the registration form data may not be sent to the STB 11. To describe the registration processing, it is now assumed that registration form data be sent.

The processing of step S22 is performed in the content-distribution reservation unit 201 (FIG. 7). That is, a request to access from the STB 11, in this case, a registration request, is supplied to the content-distribution reservation unit 201 under the control of the communication controller 207 of the service provider 2. The content-distribution reservation unit 201 manages data concerning an initial screen which is always provided when receiving an access request or an initial screen specially used for registration, and sends the data as the registration form data.

In step S12, the initial screen data sent from the service provider 2 is received by the STB 11. The initial screen data received under the control of the communication controller 221 of the STB 11 is supplied to the distribution controller 222. When determining that the supplied (sent) data is the initial screen data, the distribution controller 222 supplies the data to the playback unit 226.

Figure 10:
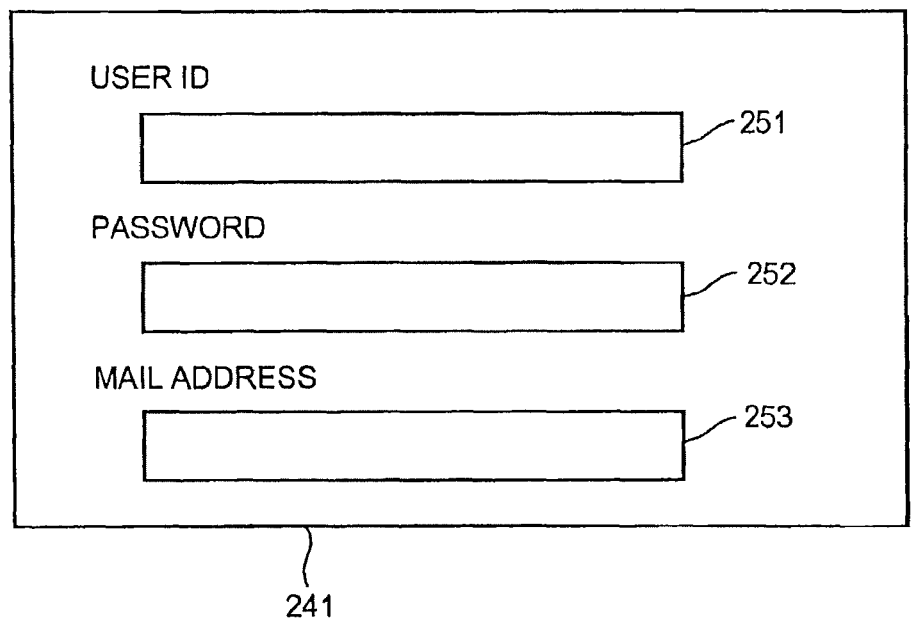
FIG. 10 illustrates an example of the screen displayed on a television receiver.

The playback unit 226 plays back the supplied data. As a result, a screen, such as that shown in FIG. 10, is displayed on the display of, for example, a television receiver, connected to the STB 11. The screen shown in FIG. 10 is the registration initial screen on which a user ID input column 251 for inputting a user ID, a password input column 252 for inputting a password, and a mail address input column 253 for inputting a mail address are disposed.

The user ID is an ID that can be freely assigned by the user, and is a character string having a predetermined number of digits, for example, alphabets, numbers, and kana characters. The password is also a character string having a predetermined number of digits that can be freely assigned by the user. The mail address may be an email address if the STB 11 has the function of sending and receiving email and is assigned with the corresponding email address.

In order to execute the processing described below, however, it is preferable that a mail address assigned to a device other than the STB 11, for example, a mail address assigned to the PC 12 or the cellular telephone 13, be input into the mail address input column 253. Accordingly, the item name above the mail address input column 253 may be more specifically indicated, for example, "mail address of PC or cellular telephone" rather than "mail address" shown in FIG. 10.

Although in this example the user ID, password, and mail address are input, information other than these items may be input solely or together with the above-described items of information. The information input into this screen is information that can uniquely identify the STB 11, and in this example, the STB 11 of the user A can be distinguished from other STBs (for example, the STB 21 (FIG. 1)) by the user ID.

Since the user ID can uniquely identify the STB 11, the mail address may be used as the user ID. That is, the mail address may be used for uniquely identifying the STB 11. If the mail address is used as the user ID, it is not necessary to provide both the user ID input column 251 and the mail address input column 253 on the screen of a television receiver 241 shown in FIG. 10, and one of the columns suffices.

As stated above, the screen, such as that shown in FIG. 10, is displayed on the television receiver 241 at the user side, and the time when such a screen is displayed on the television receiver 241 may be determined as follows. An item "registration" is disposed on the initial screen provided by the service provider 2, and the screen shown in FIG. 10 may be displayed when the item "registration" is selected. In this case, basically, data concerning the screen is sent and received between the STB 11 and the service provider 2 in a manner similar to that described above.

It is now assumed that the screen shown in FIG. 10 is displayed on the user television receiver 24 and that the user inputs the user ID, password, and mail address.

Figure 9:
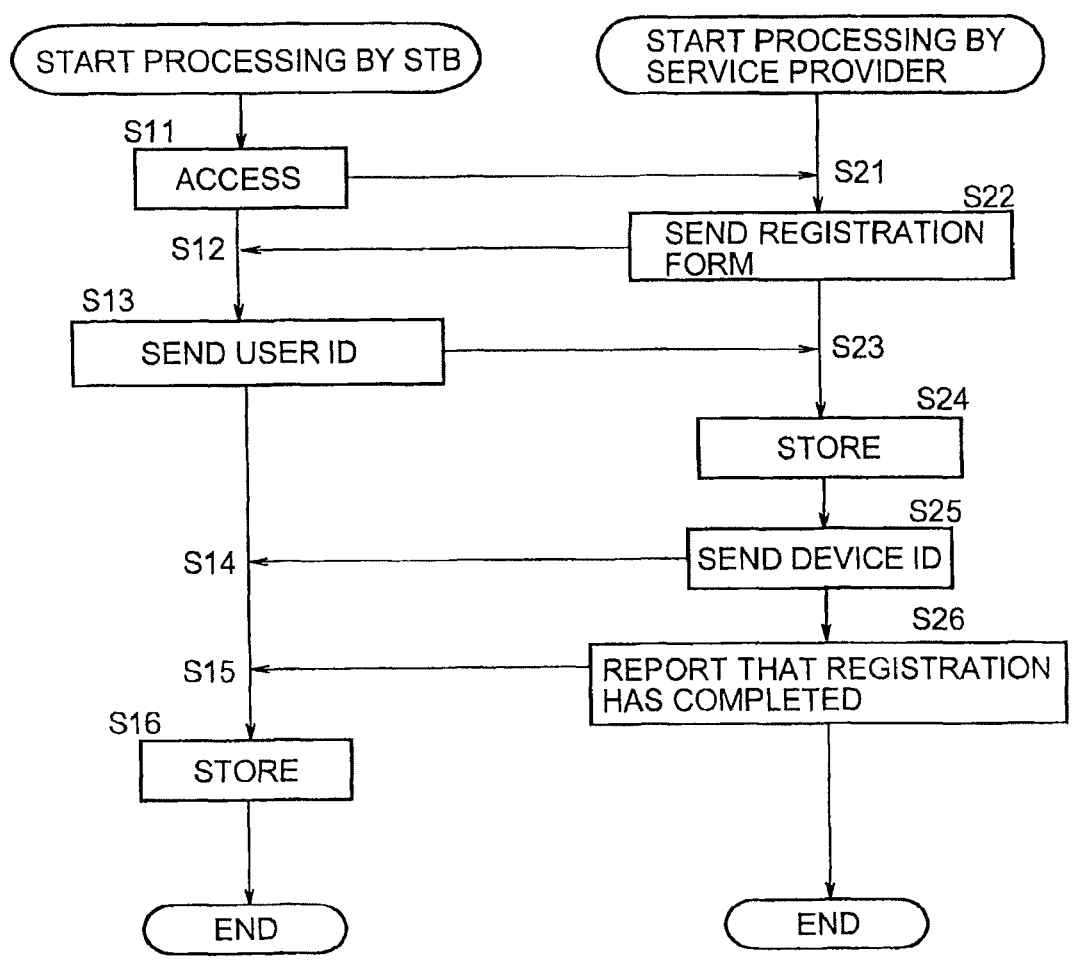
FIG. 9 is a flowchart illustrating processing for registering a device.

Referring back to the description of the flowchart of FIG. 9, in step S13, the user inputs a desired character string into the screen shown in FIG. 10, and the data is then sent to the service provider 2. Upon receiving the data, such as the user ID, in step S23, the service provider 2 stores the user ID, password, and mail address based on the received data in step S24.

The storage processing of step S24 is as follows. The data, such as the user ID, from the STB 11 is received by the communication controller 207 of the service provider 2, and is supplied to the content-distribution reservation unit 201. As discussed above, the content-distribution reservation unit 201 performs registration processing as part of the processing.

If the content-distribution reservation unit 201 determines that the data supplied from the communication controller 207 is from the STB 11 (user) which has requested to conduct registration for the first time, it writes (stores) the data into the destination database 203. FIG. 11 illustrates an example of the data configuration in the destination database 203. In the destination database 203, as shown in FIG. 11, the device ID, user ID, password, and mail address are stored in association with each other. In this case, data, such as that shown in FIG. 11, stored in the destination database 203 is sometimes referred to as a "destination table".

The device ID is prestored in the destination table. In the destination table shown in FIG. 11, numbers 000001 through 999999 are indicated (prepared) as the device IDs in advance. Although in this example the device IDs are prestored in the destination table, they may be generated when registration is conducted.

The user ID, password, and mail address received in step S23 are written into the corresponding portions of the destination table. It is assumed that "AIU" is received as the user ID, "XXXX" is received as the password, and "ΔΔΔ@z.co.jp" is received as the mail address, and are written into the device ID entry "000001".

After finishing writing (storing) data into the destination database 203 in step S24, the device ID is sent in step S25. The device ID sent from the service provider 2 in step S25 is the device ID corresponding to the entry into which the information has been written. That is, in this case, "000001" is read as the device ID and is sent to the STB 11.

After finishing sending the device ID, the service provider 2 has completed the processing for registering the STB 11. Thus, in step S26, the service provider 2 reports to the user of the STB 11 that registration has completed.

To report the completion of the registration, a simple message, for example, "registration has completed", may be displayed on the screen of the television receiver 241 connected to the STB 11. Alternatively, another message or an image may be displayed.

If, for example, the user ID to be registered is already stored in the destination database 203, a message instructing the user to change the user ID may be sent together with a message for reminding the user that registration is not completed before changing the user ID.

The same user ID is not doubly stored in the destination table in order to uniquely identify the STB 11 by the user ID, as stated above. Accordingly, processing must be performed for avoiding the double storage of the same user ID.

Meanwhile, the STB 11 receives the device ID in step S14, and then receives a completion message in step S15. In step S16, the device ID received in step S14 is stored in the device ID manager 225 (FIG. 8) of the STB 11. Based on the completion message received in step S15, the STB 11 performs processing, for example, finishing registration or changing the user ID. If the user ID is changed, the device ID is stored in step S16 only when the changed user ID is accepted in the service provider 2.

When inputting character strings into the columns on the screen shown in FIG. 10, a remote controller (not shown) for giving instructions to the STB 11 is used. Normally, however, the remote controller is not suitable for inputting characters. Additionally, the STB 11 may not have a function of inputting character strings.

Accordingly, as stated above, instead of conducting registration by using the STB 11, another device suitable for inputting character strings may preferably be used for registering the STB 11 in the service provider 2. Then, the user can perform registration processing more easily. Accordingly, processing for registering the STB 11 in the service provider 2 by using the PC 12 as an example of the device suitable for inputting characters is described below with reference to the flowchart of FIG. 12.

In step S41, the STB 11 accesses the service provider 2. In step S61, the service provider 2 receives an access request from the STB 11. The connection processing between the STB 11 and the service provider 2 is performed in a manner similar to the processing of steps S11 and S21 of FIG. 9.

In step S62, the service provider 2 sends a device ID and an alias ID to the STB 11. The device ID is an ID which is not provided to the user while remaining unknown to the user. In contrast, the alias ID is an ID which is provided and is known to the user.

A description is given below, assuming that the device ID and the alias ID are supplied from the service provider 2. The device ID and the alias ID are prestored in the service provider 2 so that they can be associated with each other. Accordingly, the alias ID can uniquely determine the device ID.

In step S62, the device ID and the alias ID are sent from the service provider 2 to the STB 11. Then, in step S42, the STB 11 receives the device ID and the alias ID under the control of the communication controller 221, and supplies the device ID and the alias ID to the distribution controller 222. In step S43, the distribution controller 222 supplies the device ID and the alias ID to the device ID manager 225 and the device ID manager 225 manages (stores) them.

After storing the device ID and the alias ID in the device ID manager 225, in step S44, the stored alias ID is sent (provided) to the PC 12. The provision of the alias ID to the PC 12 may be performed directly or indirectly.

A description is first given of the case where the alias ID is provided directly from the STB 11 to the PC 12. When, for example, the STB 11 and the PC 12 are connected via a home network, the alias ID is sent and received via this network. The sending and receiving of the alias ID can be performed, for example, when the alias ID is stored in the STB 11 or when the PC 12 is started. Alternatively, as stated below, when the PC 12 accesses (is connected to) the service provider 2, it may obtain the alias ID stored in the STB 11 via the home network.

Alternatively, the alias ID may be sent from the STB 11 to the PC 11 by email. In whichever manner, the alias ID is sent and received directly from the STB 11 to the PC 12.

A description is now given of the case where the alias ID is provided indirectly from the STB 11 to the PC 12. For example, when the alias ID is stored in the STB 11, a message for informing the user that the alias ID is stored, and the stored alias ID are displayed on the screen of the television receiver 24 connected to the STB 11. The user writes the alias ID displayed on the television receiver 24 on a medium, for example, paper.

The user then stores the alias ID written on the paper in the PC 12 (inputs the alias ID into the predetermined column, as described below). The alias ID can be stored when, for example, the PC 12 accesses (is connected to) the service provider 2.

Methods for providing the alias ID from the STB 11 to the PC 12 can be considered as described above. Thus, the timing of receiving the alias ID by the PC 12 may be before or after step S52 shown in FIG. 12, and such a timing can be changed according to the provision method for the alias ID.

Since the PC 12 has been taken by way of example to perform the above-described processing, the above methods for providing the alias ID can be considered. If the cellular telephone 13 performs the processing, an image of the alias ID may be captured by the CCD camera 126 (FIG. 5) of the cellular telephone 13, and the captured image of the alias ID is identified and stored by the processing of the cellular telephone 13.

In a device provided with an image capturing unit, such as the CCD camera 126, code for providing information, i.e., so-called "two-dimensional barcode", may be used for providing the alias ID to the user device.

Regardless of the timing of providing the alias ID from the STB 11 to the PC 12 (or cellular telephone 13), the PC 12 starts accessing the service provider 2 in step S52 after the alias ID is stored in the STB 11. As stated above, the service provider 2 manages a site that can be browsed on the network 1. The user operates the PC 12 to browse the site.

When the PC 12 is ready to browse the site managed by the service provider 2, the service provider 2 sends registration form data to the PC 12 in step S64. The PC 12 receives the registration form data in step S53. Then, the registration screen based on the received data is displayed on the display unit, which serves as the output unit 107 of the PC 12 (FIG. 4).

Figure 13:
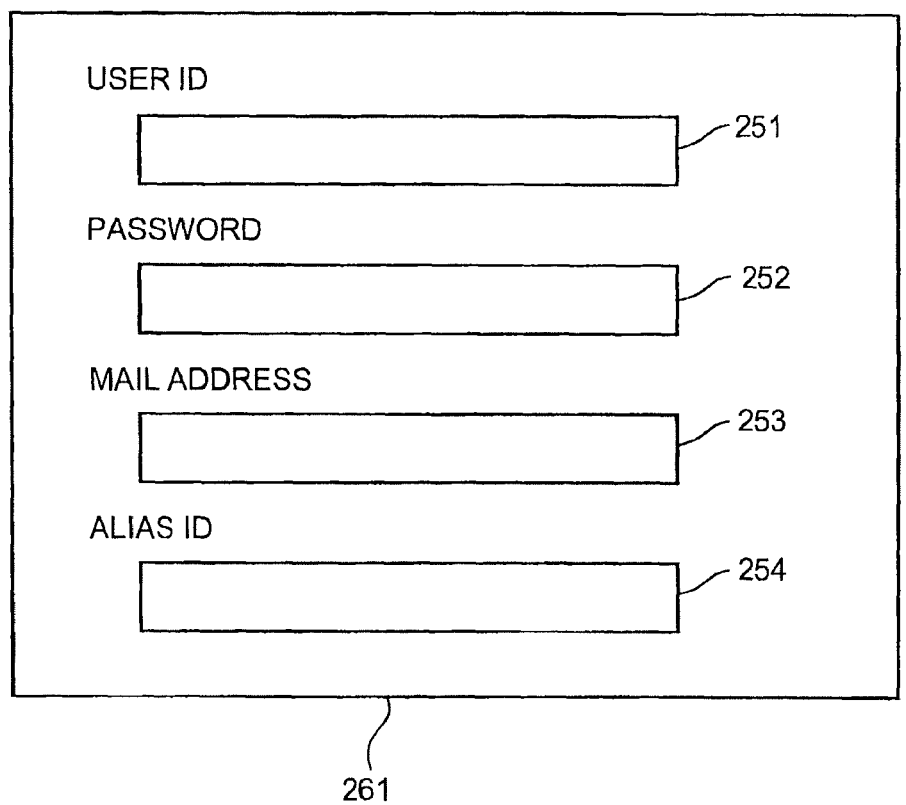
FIG. 13 illustrates an example of the screen displayed on a display unit.

FIG. 13 illustrates an example of the registration form displayed on a display unit 261 of the PC 12. In the configuration of the registration form displayed on the display unit 261 shown in FIG. 13, an alias ID input column 254 for inputting the alias ID is added to the registration form displayed on the television receiver 241 shown in FIG. 10.

The user operates the keyboard (not shown), which serves as the input unit 106 of the PC 12, to input information (character strings) into the individual columns of the registration form shown in FIG. 13. If the alias ID of the STB 11 is already obtained, it may be automatically displayed in the alias ID input column 254 without the need for the user to input it.

Normally, the PC 12 is provided with a keyboard, which is suitable for inputting character strings, as the input unit 106, and thus, the PC 12 is more suitable for inputting character strings required for the registration form than the STB 11. Accordingly, it is advantageous and easy for the user to perform registration processing of the STB 11 in the service provider 2 by using the PC 12, which is a different device from the STB 11.

When various items of information are input into the predetermined columns of the registration screen shown in FIG. 13, in step S54, the information is sent to the service provider 2 from the PC 12. Upon receiving the information from the PC 12 in step S65, the service provider 2 stores the information in step S66. After the storage of the information, the service provider 2 reports to the PC 12 in step S67 that the registration has completed.

Upon receiving a registration completion report from the service provider 2, the PC 12 performs corresponding processing in step S55; for example, it displays a message for informing the user that the registration processing has completed on the display unit 261.

Figure 12:
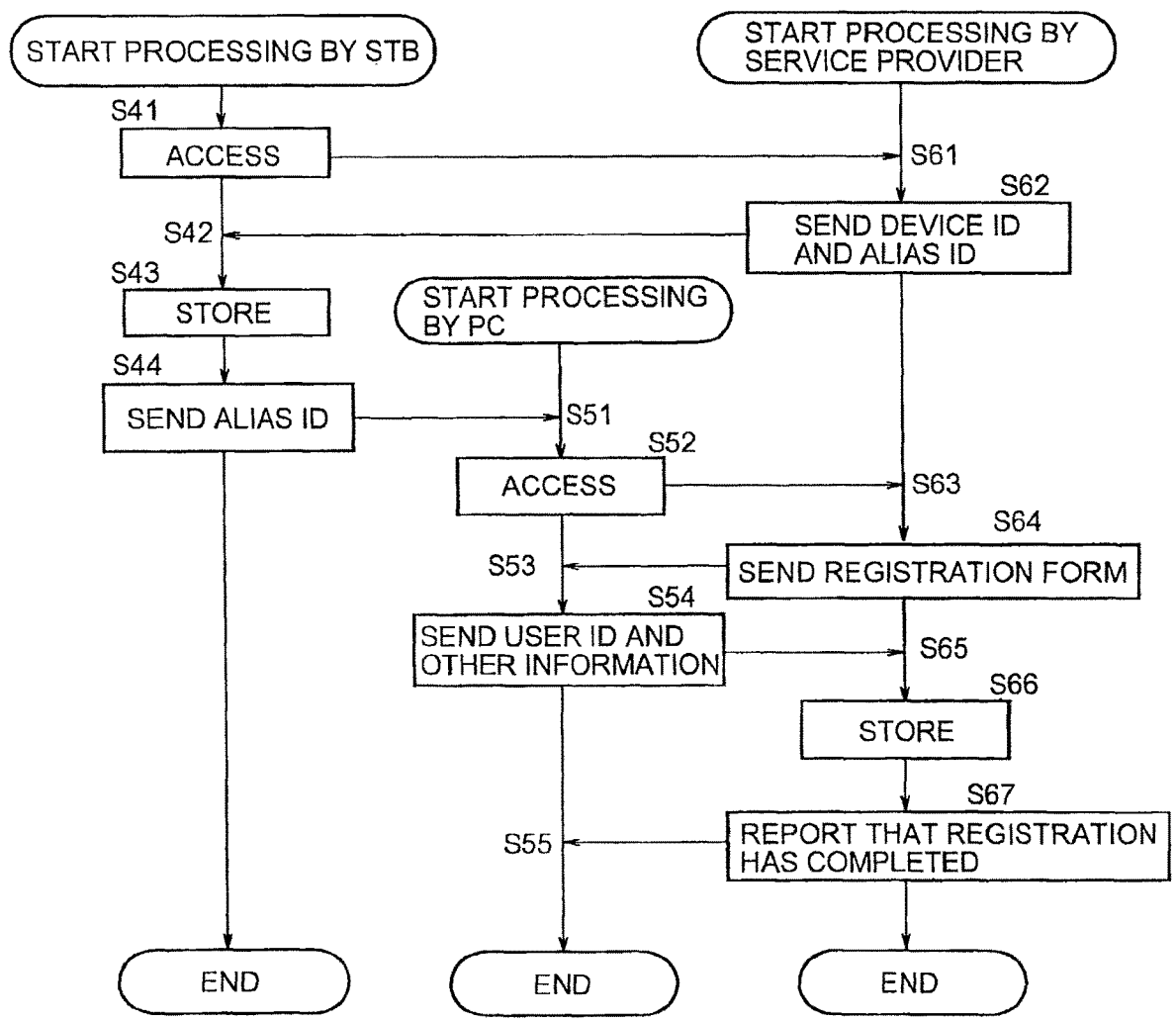
FIG. 12 is a flowchart illustrating another processing for registering a device.

A description has been given, assuming that the processing between the STB 11, the PC 12, and the service provider 2 shown in FIG. 12 is performed only once. However, it may be repeated a plurality of times, in which case, user IDs and passwords that are different among family members can be registered in one terminal. In other words, a plurality of users can be registered in the STB 11.

The registration of a plurality of users in a single device can be implemented by repeatedly performing the processing between the STB 11, the PC 12, and the service provider 2 shown in FIG. 12. In this case, the processing may be repeated continuously, and or it may be performed at time intervals. As described below, however, if the alias ID is deleted (changed), the processing must be performed before changing the alias ID. However, if the alias ID is not changed, or if the user registration can be conducted by information other than the alias ID, the above-described restriction can be eliminated.

Referring back to the description of the flowchart of FIG. 12, the storage processing in step S66 and the registration completion report in step S67 performed by the service provider 2 are basically similar to steps S24 and S26, respectively, of FIG. 9, and step S67 executed by the PC 12 is basically similar to step S26 executed by the STB 11 in FIG. 9, and an explanation thereof is thus omitted.

On the other hand, the storage processing conducted in step S66 by the service provider 2 is slightly different from that of step S24 in FIG. 9, and thus, the processing different from that of step S24 is explained below. The destination table of the destination database 203 (FIG. 7) in the service provider 2 when the processing is performed according to the flowchart of FIG. 12 is shown in FIG. 14.

In the destination table of the destination database 203 shown in FIG. 14, a column into which the "alias ID" is written is added to the destination table shown in FIG. 11. As discussed above, the alias ID is associated with the device ID and thus uniquely determines the device ID. The alias ID is an ID that is provided to the user by being known to the user. Accordingly, in the destination table, the alias ID has been written in association with the device ID.

The service provider 2 manages a destination table, such as that shown in FIG. 14, and information sent to the STB 11 in the processing of step S62 (FIG. 12) is only the device ID and the corresponding alias ID in the destination table. That is, a set of the device ID and the alias ID are provided to the STB 11 before the PC 12 accesses the service provider 2.

In this state, the service provider 2 receives information, such as the user ID, password, mail address, and alias ID, from the PC 12 of the user under the control of the communication controller 207, and the received information is then supplied to the content-distribution reservation unit 201.

The content-distribution reservation unit 201 reads the alias ID from the supplied information, and then, checks the destination table, which is managed by the destination database 203, to determine the entry of the destination table into which the read alias ID is written.

The content-distribution reservation unit 201 writes the supplied user ID, password, and mail address into the determined entry of the destination table. In this manner, the information of each user that has sent a request to register him/her is written into the corresponding entry of the destination table, such as that shown in FIG. 14.

As discussed above, by providing an ID, i.e., the alias ID, registration processing can be performed by using a device (in this case, the PC 12) other than a device (in this case, the STB 11) that has sent a request to register it without the need to make sensitive information, i.e., the device ID, known to the user.

Basically, the number of device IDs is limited. The flowchart of FIG. 12 shows that, after the device ID is stored in the STB 11 in step S43, the user does not always register the STB 11 in the service provider 2 by using a device, for example, the PC 12. In other words, the destination table may be left for a long period without having the user information written into the entry corresponding to the device ID assigned to the STB 11.

This means that some device IDs may remain unused. Accordingly, the following function may be provided for the service provider 2. That is, if registration is not conducted within a predetermined period after the device ID is stored in the STB 11, such a device ID is allocated to another device. Then, the device IDs can be efficiently allocated.

In this case, the service provider 2 first detects device IDs that remain unused for a predetermined period without conducting registration processing (without writing information, such as the user ID, into the corresponding entry even though a set of the device ID and the alias ID are provided). As a result of detection, the service provider 2 changes the alias IDs associated with the device IDs that have expired.

In this manner, by changing the alias IDs, even if the user of the STB 11 storing the previous alias ID performs registration processing after the predetermined period, the registration is not accepted because the previous alias ID is different from the current alias ID. Also, by changing the alias ID, the changed alias ID can be provided to another STB, thereby achieving the effective use of the device IDs.

After registering the STB 11 in the service provider 2 according to the flowchart of FIG. 12, there are two items of information, i.e., the alias ID (information 1) and the user ID (information 2), as information for uniquely determining the device ID assigned to the STB 11. Accordingly, after registering the STB 11 in the service provider 2, the device ID may be determined by using either information 1 or information 2.

By taking this into consideration, if the user ID as information 2 determines the device ID, the alias ID as information 1 does not have to be stored (managed) in the destination table (FIG. 14). Accordingly, alias IDs corresponding to user information, such as user IDs, which have already been written into the corresponding entries after conducting registration processing may be deleted. With this arrangement, the deleted alias IDs can be associated with other device IDs, thereby making it possible to reuse the alias IDs.

Basically, many device IDs must be prepared for conducting contract with many users (devices). In order to avoid the use of the same ID, character strings having many number of digits are used. If the device IDs and alias IDs are associated with each other based on a one-to-one correspondence, the same number of alias IDs as that of the device IDs must be prepared, and character strings having the number of digits similar to that of the device IDs must be used.

However, the alias ID is provided to the user, and the user himself/herself may have to input the corresponding character string. Considering that the user may have to input the alias ID, the small number of digits of the character string is preferable.

As stated above, if the alias IDs can be reused, the number of alias IDs that should be prepared can be smaller than the number of device IDs (i.e., the device IDs and the alias IDs do not have to be associated based on one-to-one correspondence). Thus, the number of alias IDs can be reduced. If the number of alias IDs is small, the alias IDs can be allocated while avoiding the use of the same IDs even if the number of digits of the character strings forming the alias IDs is smaller.

A further description of the alias IDs is given. It can be considered, for example, as shown in FIG. 1, that the user A owns a plurality of devices, such as the STB 11, the PC 12, and the cellular telephone 13, for receiving content data. That is, it can be considered that one user owns a plurality of devices for receiving content data. In this case, the user performs the above-described registration processing for each device.

As a result, the user has to register the alias ID, user ID, password, and mail address for each device. When the device ID can be uniquely determined by the user ID, as described above, the same user ID cannot be registered even for the same user. Accordingly, when registering a plurality of devices, the user has to register them with a plurality of user IDs and also to memorize them. Even if the device ID is uniquely determined by the alias ID, the user also has to memorize a plurality of alias IDs.

This is not convenient for the user. Accordingly, to improve the ease of use, the following processing is performed. The following processing is not necessary if a condition, for example, that one user can register only one device in the service provider 2, is given.

As discussed above, after a predetermined device is registered in the service provider 2, the alias ID assigned to the device does not have to be managed by the service provider 2. Accordingly, if the alias ID can be changed by the user side, the ease of use for the user can be enhanced.

In this case, it is assumed that the STB 11 already stores the device ID and the alias ID and that the PC 12 stores (obtains) the alias ID assigned to the STB 11. The process up to the storage (obtaining) processing is performed in a manner similar to the process between the STB 11 and the service provider 2 indicated by the flowchart of FIG. 12, and an explanation thereof is thus omitted.

The processing for registering the STB 11 in the service provider 2 by the PC 12 is described below with reference to the flowchart of FIG. 15. Steps S81 through S83 of the PC 12 and steps S91 through S93 of the service provider 2 are similar to steps S52 through S54 and steps S63 through S65, respectively, of the flowchart of FIG. 12, and an explanation thereof is thus omitted.

Upon receiving the user ID, password, mail address, and also the alias ID assigned to the STB 11 from the PC 12 in step S93, the service provider 2 conducts user authentication (password check) in step S94. In this case, such authentication is conducted since the user who has already been registered accesses the service provider 2 to change the alias ID into a terminal name.

If it is determined in step S94 that the same user ID as the received user ID is stored in the destination table and that the password coincides with the stored password, i.e., if it is determined that user authentication has succeeded, the process proceeds to step S95 in which data concerning a changing form is read. The changing form is a form for changing the alias ID into a terminal name. The terminal name is a name assigned to the device that has been registered (in this case, the STB 11) by the user.

If it is determined in step S94 that the same user ID as the received user ID is not stored in the destination table, and that the password does not coincide with stored password, i.e., if it is determined that user authentication has failed, the process proceeds to step S96 in which data concerning a re-input form is read. The re-input form is a form for instructing the user to re-input the user ID and password by assuming that the user authentication has failed because the user ID or password has been wrongly input.

Figure 16:
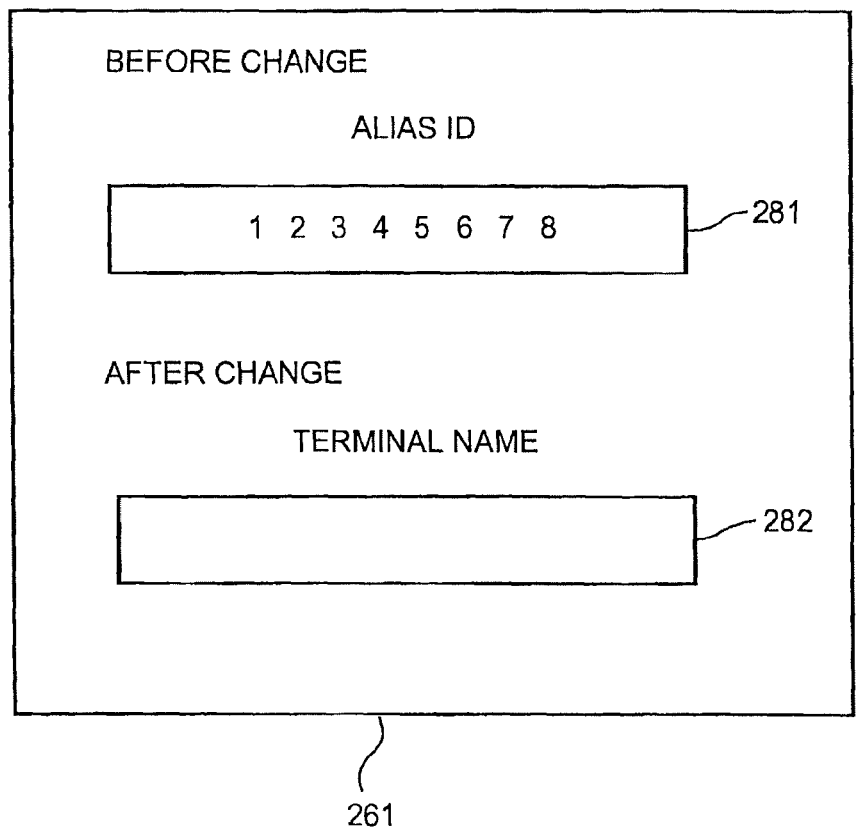
FIG. 16 illustrates an example of the screen displayed on a display unit.
Figure 17:
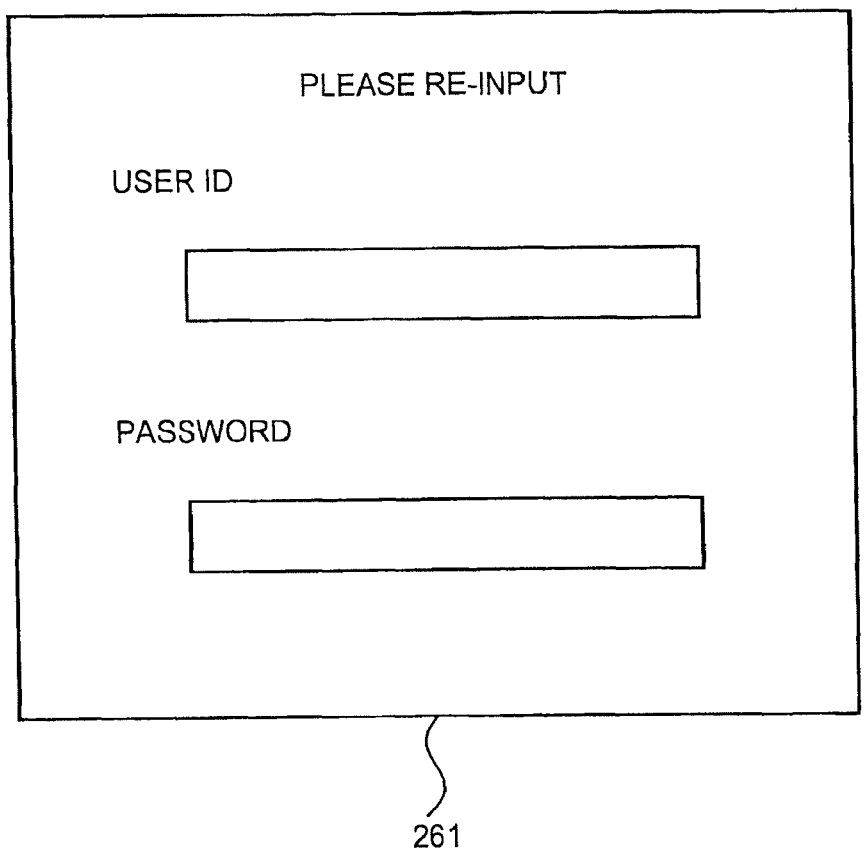
FIG. 17 illustrates an example of the screen displayed on a display unit.

In step S97, the read changing form or re-input form data is sent to the PC 12. In step S84, the data is received by the PC 12. The PC 12 displays a screen, such as that shown in FIG. 16 or 17, on the display unit 261 as the screen based on the received data. The screen shown in FIG. 16 is for changing the alias ID based on the changing form data. The screen shown in FIG. 17 is for re-inputting information based on the re-input form data.

On the changing screen shown in FIG. 16, a column 281 for indicating the alias ID before being changed and a column 282 for inputting a terminal name after being changed are provided. On the re-input screen shown in FIG. 17, columns for inputting the user ID and password are provided.

As the alias ID indicated in the column 282 on the screen shown in FIG. 16, the alias ID received and stored in step S93 is attached to and sent together with the changing form data sent from the service provider 2 in step S97. With this arrangement, the screen with the input alias ID can be displayed on the display unit 261 of the user PC 12.

The user inputs a desired name into the column 282 of the screen shown in FIG. 16. For example, in this case, since the STB 11 is to be registered in the service provider 2, the name "STB" is input into the column 282. Characters may be input into the column 282 so that the user can input a desired name. Alternatively, the user may select a desired name from a pull-down menu.

The user inputs (selects) a desired terminal name on the screen, such as that shown in FIG. 16, or inputs other information if necessary, and then, the information is sent to the service provider 2 from the PC 12 in step S84. In step S98, the service provider 2 then receives data concerning the above-described change from the PC 12.

If the user ID and password are re-input into the screen, such as that shown in FIG. 17, step S94 and the subsequent steps are repeated in the service provider 2.

The service provider 2 performs processing for changing the data in step S99, and stores the changed data in step S100. The changing and storage processing is performed by determining the corresponding entry in the destination table from the received alias ID before being changed and by writing the changed terminal name into the corresponding portion of the column into which the alias ID is written.

In the above-described description, the alias ID is rewritten into the terminal name. However, the terminal name may be added while the alias ID remains being stored. In this case, the alias ID may be used in the processing described below.

When storing the information after being changed in the service provider 2, the service provider 2 sends a completion report to the PC 12 in step S101. The processing of step S101 and the corresponding processing of step S85 of the PC 12 are similar to the processing of step S67 and the corresponding processing of step S55 of the PC 12 in FIG. 12, and an explanation thereof is thus omitted.

Figure 15:
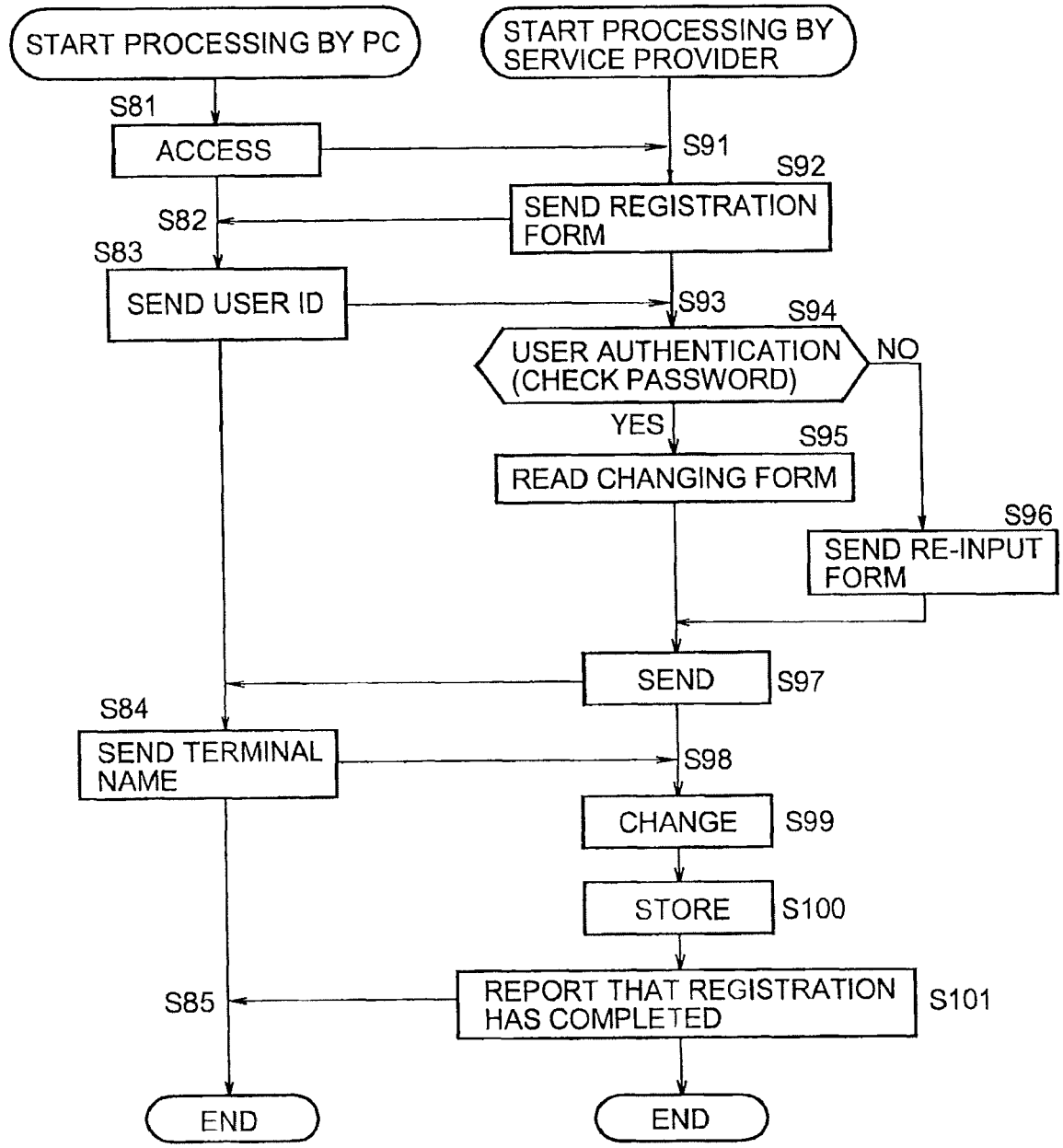
FIG. 15 is a flowchart illustrating processing for changing registered information.

The destination table stored in the destination database 203 of the service provider 2 after performing the processing based on the flowchart of FIG. 15 can be schematically shown in FIG. 18. In the example of the destination table shown in FIG. 18, the user having a user ID "AIU", a password "XXXX", and a mail address "ΔΔΔ@z.co.jp" has two devices, such as an "STB" and a "PC". The device ID "000001" is allocated to the device "STB", and the device ID "010021" is allocated to the device "PC".

The user having a user ID "KAKIKU", a password "○○○○", and a mail address "ΔXΔ@x.co.jp" has three devices, such as a "personal computer", an "STB", and a "cellular telephone". The device ID "001234" is allocated to the device "personal computer", the device ID "001235" is allocated to the device "STB", and the device ID "001236" is allocated to the device "cellular telephone".

In this manner, a plurality of devices (terminal names) are associated with one user ID, and the device ID is associated with each device. By using such a destination table, a single user can receive (purchase) content data by using a desired device selected from a plurality of devices with the same user ID. A description is given below of the processing for purchasing content data by using the destination table shown in FIG. 18 by way of example.

The processing for purchasing content data from the service provider 2 by a device storing the device ID therein is first discussed with reference to the flowchart of FIG. 19. In this description, the STB 11 is taken as an example of the device storing the device ID, and the STB 11 purchases content data from the service provider 2.

In step S121, the STB 11 starts accessing the service provider 2. The access is made in response to a user instruction. In step S131, the service provider 2 receives an access request from the STB 11.

If the service provider 2 determines that the access request from the STB 11 is a request to purchase content data, in step S132, it sends information concerning content data to the STB 11 that has made the access request. The data sent in this step is content accompanying data stored in the content database 202. FIG. 20 illustrates an example of the configuration of the content accompanying data stored in the content database 202.

The content accompanying data is information indicating the content ID, which is assigned to each item of content data, for uniquely determining the content data, the size of the content data, the fee for purchasing the content data, and details of the content provided by the content data.

Upon receiving the data from the service provider 2 in step S122, the STB 11 displays a screen based on the received data on the television receiver 241 connected to the STB 11. The user checks the screen displayed on the television receiver 241 to determine content data to be purchased.

When the user determines the content data to be purchased, the content ID assigned to the determined content data is sent to the service provider 2 together with the device ID. The device ID managed by the device ID manager 225 of the STB 11 is read and is sent together with the content ID.

In step S133, the service provider 2 receives the data from the STB 11. In step S134, the service provider 2 extracts the device ID contained in the received data. The service provider 2 then determines based on the extracted device ID whether the device having the device ID is an authorized device for purchasing the requested content data by checking the data stored in the destination database 203 and the content accompanying data stored in the content database 202.

If it is determined in step S134 that the purchasing of the content data is permitted, the process proceeds to step S135. If it is determined in step S134 that the purchasing of the content data is not permitted, the process for purchasing content data shown in FIG. 19 is terminated. If it is determined in step S134 that the purchasing of the content data is not permitted, a message indicating that the purchasing of the content data is not permitted is preferably sent to the user.

In step S135, the content data and the license data are sent to the STB 11 based on a schedule formed by the scheduler 204. Although details are given below, the scheduler 204 determines the timing of sending the content data to the user, and forms a schedule based on the determination result and controls the content data to be sent based on the schedule.

When sending the content data, the scheduler 204 instructs the license issuer 206 to issue license data. The license data is data concerning usage conditions containing data for preventing unauthorized copying or playback operation, and is provided to the user together with the content data.

The license issuer 206 stores a table containing data shown in FIG. 21, namely, the license ID, usage conditions identified by the license ID, and content ID subjected to the usage conditions associated with each other. The usage conditions include conditions, such as purchase, rental, one-time copy.

One license ID is assigned to one usage condition, and a plurality of content IDs can be associated with one license ID. This makes it possible to apply the same usage condition to a plurality of items of content. One license ID may be associated with a plurality of usage conditions. That is, one license data may be generated by a combination of a plurality of usage conditions, and one license ID may be assigned to such license data.

By using such data, the license issuer 206 issues license data. The content accompanying data shown in FIG. 20 and the license data shown in FIG. 21 are examples only, and other data may be added and stored, and such added data may be used to perform processing described below.

The scheduler 204 forms a schedule from the content accompanying data stored in the content database 202 and the data stored in the license issuer 206. One example of the schedule formed is shown in FIG. 22.

Every time a request to send content data is made, a schedule corresponding to the request is formed. The transaction ID for identifying each schedule is disposed at the head of the schedule.

The content ID for identifying the content requested by the user is read from the content database 202 (FIG. 20) and is associated with the transaction ID. The license ID corresponding to the usage condition applied to the content requested by the user is read from the license issuer 206 and is associated with the transaction ID. The destination ID is the device ID assigned to the device specified by the user as the destination of the content data, and is read from the destination database 203 if necessary.

The billing user ID is the user ID to which a fee for purchasing the content data is charged. As the distribution time, the time specified by the user is basically set. If the user has not specified the time or if the content data cannot be sent at the time specified by the user, the time specified by the service provider 2 is set. In the distribution status, information concerning the distribution status, for example, "not yet distributed", "now distributing", or "distributed", is written.

The content data is sent based on such a schedule. In this case, if the request is made from the STB 11 and there is no request (necessity) to send the content data later, the service provider 2 can respond to this request immediately, and thus, the time at which the schedule was formed may be written into the distribution time in the schedule.

The communication controller 207 sends the content data and the license data (usage conditions) to the STB 11 based on the schedule formed by the scheduler 204.

In step S124, the STB 11 receives the data from the service provider 2. In step S125, the STB 11 stores the received data. In this storage processing, the data received under the control of the communication controller 221 is first supplied to the distribution controller 222. The distribution controller 222 supplies the content data of the supplied data to the storage unit 223, and supplies the license data to the license manager 224.

The storage unit 223 and the license manager 224 store the supplied data therein. In this manner, the content data is purchased by the STB 11. Although a description of billing is not given, when the purchase processing is performed, billing processing is also performed by the service provider 2. Also in the following description, when the purchase processing for content data is performed, billing processing is also performed.

Figure 23:
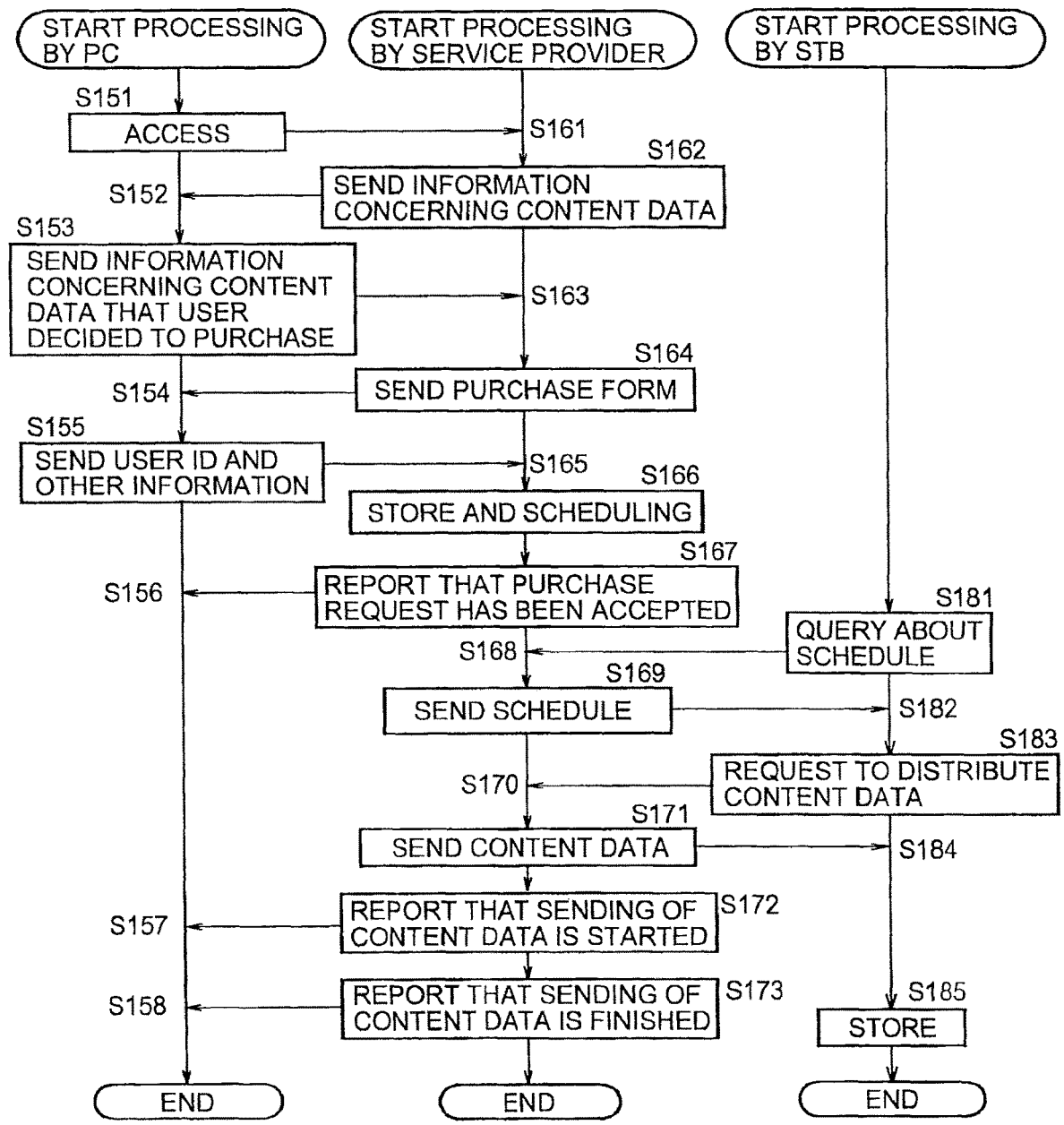
FIG. 23 is a flowchart illustrating another purchase processing.

A description is now given, with reference to the flowchart of FIG. 23, of the processing when the PC 12 purchases content data and the STB 11 stores the purchased content data. In this case, the device for purchasing the content data and the device for storing the purchased content data are different. The overall processing is schematically discussed first, and then, details of the processing in each device are given.

Figure 19:
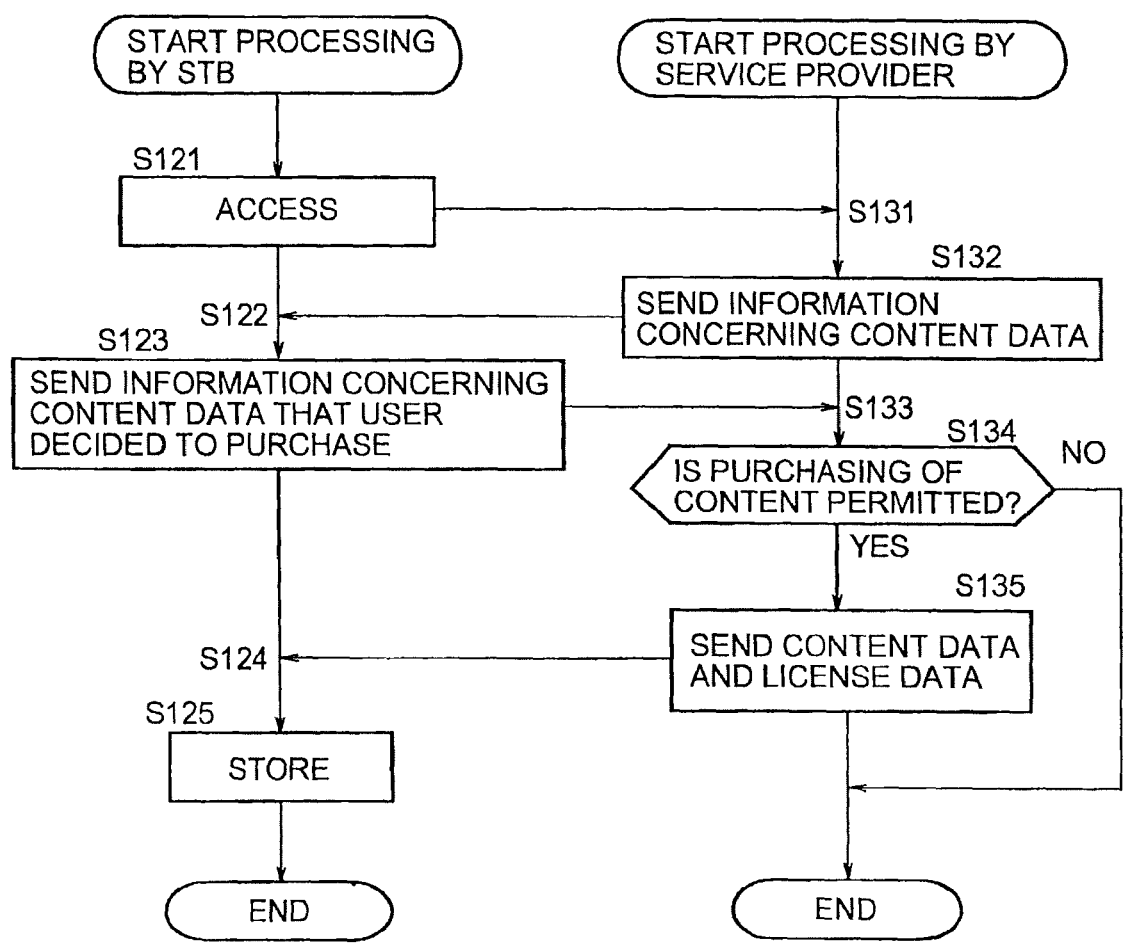
FIG. 19 is a flowchart illustrating purchase processing.

Steps S151 through S153 of the PC 12 are basically similar to steps S121 through S123 of the STB 11 of FIG. 19, and steps S161 through S163 of the service provider 2 corresponding to steps S151 through S153 are basically similar to steps S131 and S132 of the service provider 2 of FIG. 19, and an explanation thereof is thus omitted.

In step S153, however, only the content ID for identifying the content data that the user has decided to purchase is sent from the PC 12, and the device ID is not sent from the PC 12. This is because the device ID is an ID assigned to and managed by the STB 11 and cannot be sent from the PC 12.

Upon receiving the data from the PC 12 in step S163, the service provider 2 sends purchase form data to the PC 12 in step S164. Since there is no device ID in the received data, the service provider 2 determines that a request to purchase content data has been sent from a device without a device ID. The service provider 2 then sends purchase form data to request the PC 12 to send information for the destination device of the purchased content data and for checking whether the user is an authorized user.

Upon receiving the purchase form data in step S154, the PC 12 displays a purchasing screen based on the data on the display unit 261. The user checks the screen to input required items, for example, the user ID and password. In step S155, the input user ID and password data are sent from the PC 12 to the service provider 2.

Upon receiving the data from the PC 12 in step S165, the service provider 2 stores the received data and also performs scheduling based on the data in step S166. Although details are given below, password authentication or the checking of the destination device of content data is conducted when performing scheduling, such as that shown in FIG. 22. It is now assumed that such processing has completed and the process proceeds to step S167.

In step S167, the service provider 2 performs content purchase processing, that is, the service provider 2 reports to the user that the request to purchase content has been accepted. Upon receiving such a report in step S156, the user PC 12 performs processing based on this report, for example, the PC 12 displays a message such as "content purchase request has been accepted" on the display unit 261.

Meanwhile, in step S181, the STB 11 queries the service provider 2 as to a schedule. The STB 11 queries the service provider as to whether a schedule for the STB 11 (schedule in which the STB 11 is specified as the destination of the content data) has been formed. Such a query is made, for example, every hour, from the STB 11 to the service provider 2. In this case, it is assumed that, as a result of performing the above-described processing, the STB 11 makes a query to the service provider 2 after a schedule for the STB 11 has been formed and that the query is received by the service provider 2 in step S168.

If the service provider 2 determines that there is a schedule for the STB 11 in response to the query from the STB 11, it sends the schedule for the STB 11 in step S169. To make the above determination, the STB 11 sends the device ID when making a query, and the service provider 2 determines whether a schedule associated with the device ID has been formed (stored) by the scheduler 204.

The schedule sent from the service provider 2 in step S169 is received by the STB 11 in step S182. The received schedule contains information concerning the sending due time. When the due time reaches, the STB 11 requests the service provider 2 to send the content data. Upon receiving this request in step S170, the service provider 2 responds to the request and starts sending the content data in step S171.

When the sending of the content data is started, the service provider 2 reports to the PC 12 that the sending of the purchased content data to the STB 11 is started in step S172. When the sending of the content data to the STB 11 is finished (step S173), the service provider 2 reports to the PC 12 that the sending of the content data is finished. The report from the service provider 2 to the PC 12 is conducted by, for example, email.

The STB 11 stores the content data in step S185.

As described above, the content purchasing processing is performed in the PC 12, and the purchased content data is stored in the STB 11.

Then, details of the processing of the flowchart in FIG. 23 are discussed for each device. For the processing of the PC 12, the PC 12 basically repeats processing for displaying the screen based on the data received from the service provider 2 and sending information input into the screen, and an explanation of such processing is thus omitted. If necessary, however, the processing of the PC 12 is discussed together with the processing of the service provider 2.

The processing for purchasing content (processing for communicating with the PC 12) by the service provider 2 is described below with reference to the flowchart of FIG. 24. In step S201, the service provider 2 determines whether access has been made from another device. The service provider 2 repeats step S201 in the standby mode until it determines that access has been made from another device.

If it is determined in step S201 that access has been made from another device, the process proceeds to step S202. In step S202, content accompanying data is read from the content database 202 and is sent to the device that has made access. After sending the content accompanying data, the service provider 2 remains in the standby mode until the user decides desired content and receives the content ID of the decided content.

The content accompanying data sent to another device (for example, PC 12) from the service provider 2 contains the content IDs. At least the content ID of the content that the user has decided to purchase is sent to the service provider 2 and is received as a request to purchase content from the user. The service provider 2 determines in step S203 whether such a content purchase request has been received from the user.

The service provider 2 remains in the standby mode until it determines that a content purchase request has been received, and when it is received, the process proceeds to step S204. In step S204, it is determined whether the device ID is contained in the received content purchase request.

As stated above, when a purchase request is made from a device to receive the content data (device that has obtained and stored the device ID), such as the STB 11, the device ID is sent together with the content ID. However, when a purchase request is made from a device that does not receive the content data (device that has not obtained the device ID), such as the PC 11 or the cellular telephone 13, only the content ID is sent.

Accordingly, in step S204, it is determined whether the received request (data) contains the device ID. As a result of this determination, it can also be determined whether the device that has sent a content purchase request has already been registered as the device that can receive the content data.

The process may be modified that step S204 is omitted to always send a purchase form. This is to respond to a user's desire: when the PC 12 has obtained and stored the device ID assigned to the PC 12, the user performs processing for purchasing the content data by using the PC 12 but wishes to store the purchased content data in the STB 11. Alternatively, processing for instructing the user to specify the destination of the purchased content data in another manner may be added.

If it is determined in step S204 that the received data does not contain the device ID, the process proceeds to step S205 in which purchase form data is sent. The purchase form data is data for displaying a screen, such as that shown in FIG. 25, on a user device, for example, the display unit 261 of the PC 12.

Figure 25:
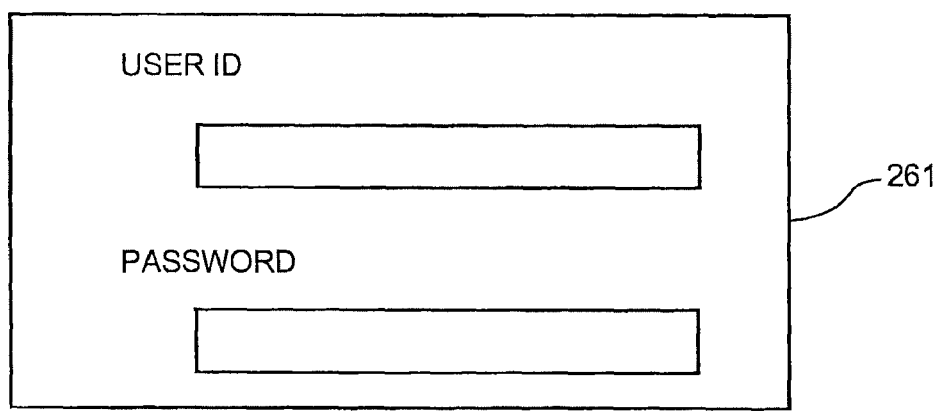
FIG. 25 illustrates an example of the screen displayed on a display unit.

On the screen based on the purchase form data, as shown in FIG. 25, a column for inputting a user ID and a column for inputting a password are provided. The reason for inputting the user ID and password is to specify the device ID by the user ID and to conduct user authentication by the password. If the alias ID is still stored in the destination table of the service provider 2, it may also be sent and received.

When the user inputs the user ID and password by referring to the screen shown in FIG. 25, the information is sent to the service provider 2, and the service provider 2 receives information concerning the user ID and password in step S206. The service provider 2 specifies the device ID from the received user ID in step S207.

A destination table, such as that shown in FIG. 18, is stored in the destination database 203 of the service provider 2, and the device ID is specified by referring to this table. For example, if the received user ID is "AIU" and the password is "XXXX", two device IDs "000001" and "010021" can be specified, as shown in FIG. 18.

It is then determined in step S208 whether plural device IDs have been specified. Since two device IDs can be specified in the above-described situation, the result of step S208 becomes YES, and the process proceeds to step S209. In step S209, data concerning a destination determination form is sent. The destination determination form data is data for displaying the screen for instructing the user to select (determine) the device by and in which the content data is to be received and stored.

Figure 26:
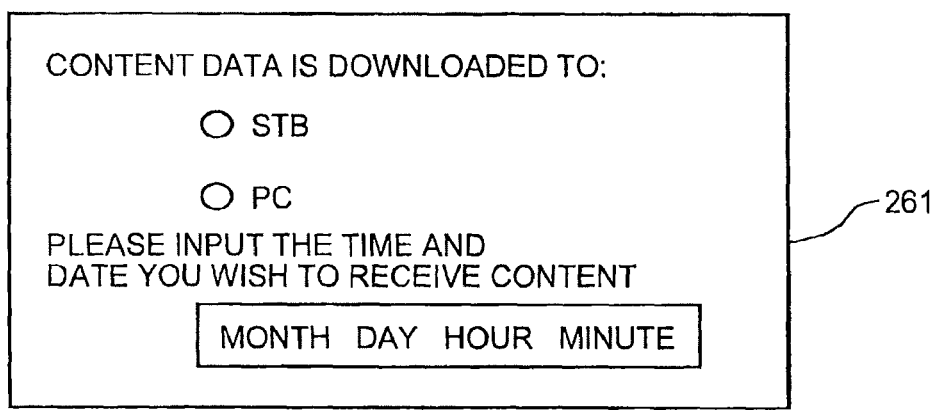
FIG. 26 illustrates an example of the screen displayed on a display unit.

The data indicating the destination determination form includes at least the terminal names (FIG. 18) corresponding to the device IDs specified in step S207. FIG. 26 is an example of the screen displayed on a device in which purchase processing is currently performed, for example, on the display unit 261 of the PC 12. If the processing is performed based on the destination table shown in FIG. 18, the terminal names "STB" and "PC" corresponding to the device IDs "000001" and "010021" are displayed on the screen shown in FIG. 26. Radio buttons for selecting the terminal names are provided before the terminal names.

In this manner, if the user who has sent a content purchase request had registered a plurality of devices as the devices for receiving the content data, the device for storing (downloading) the purchased content data can be selected with the terminal name assigned by the user. Information concerning the terminal name selected by referring to the screen shown in FIG. 26 is sent to the service provider 2.

As the downloading device, only one device may be selected by the user, or a plurality of devices may be selected by the user. Such setting is made by the service provider 2 according to the billing processing.

In step S210, the service provider 2 receives information concerning the terminal name selected as the downloading device. By receiving the terminal name information, the service provider 2 can specify the device ID of the device for receiving the purchased content data.

In step S211, the received data is stored, and scheduling based on the data is conducted. Scheduling is to generate data for the requested content, such as that configured as shown in FIG. 22, by the scheduler 204.

Step S211 is always executed to perform scheduling even when it is determined in step S204 that the device ID is contained in the received request (data) or when it is determined in step S208 that the specified device ID is only one. In any case, when only one device ID of the device for receiving the content data is specified, scheduling is performed.

When performing scheduling, information concerning the content distribution time must be obtained. Accordingly, for example, as shown in FIG. 26, a message "please input the time and date you wish to receive content" is displayed on the screen of the display unit 261 of the user, and a column for allowing the user to input a desired time may be provided under the message. When the time is input into this column, it can be set as the sending due time.

In this case, if the user does not designate the distribution time, the service provider 2 can set the time and writes it. Alternatively, only the service provider 2 may be able to set the distribution time without allowing the user to specify the time.

When performing scheduling, it is determined whether the user who has sent a request to purchase content data is an authorized user who can receive the services provided by the service provider 2, and only when the user is an authorized user, scheduling is performed. To determine whether the user is an authorized user, it is determined whether the received password is registered in the destination table in association with the user ID.

After finishing performing scheduling, in step S212, it is reported to the user device that the purchase request has been accepted. The purchase processing in the service provider 2 has completed.

Figure 27:
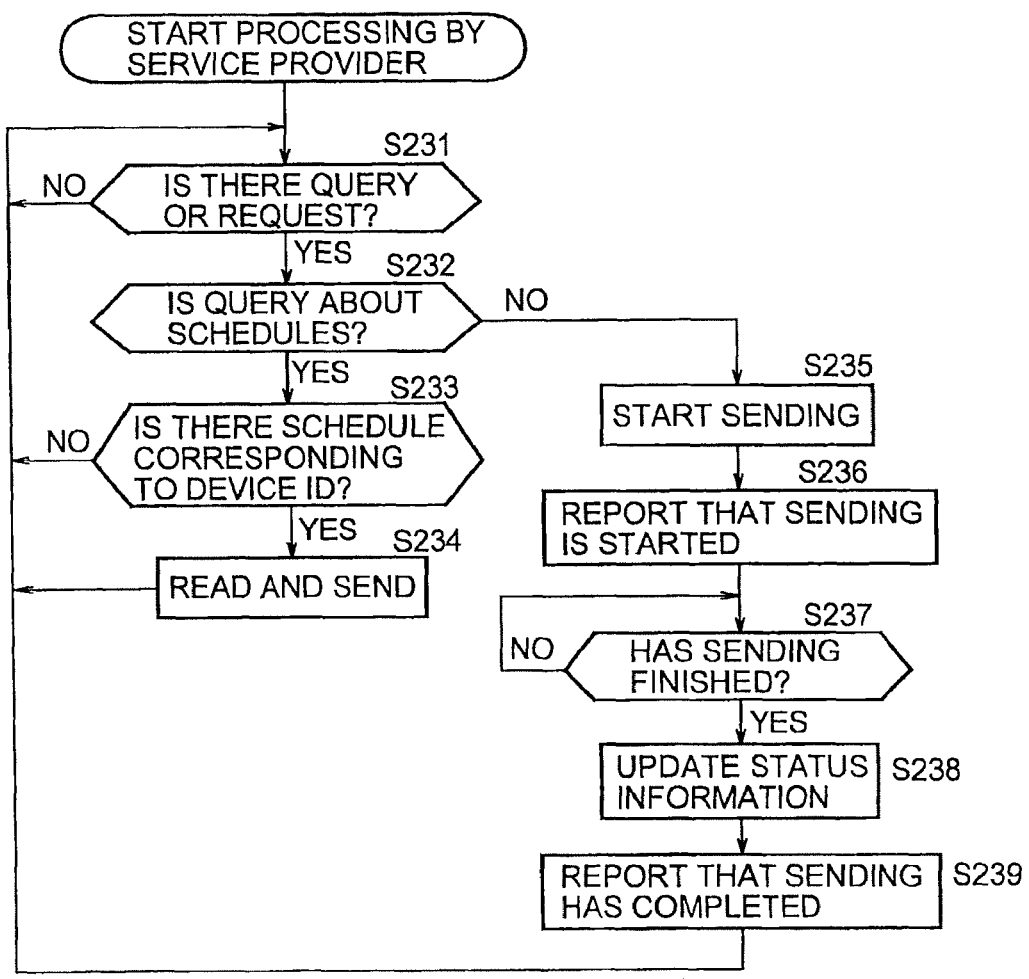
FIG. 27 is a flowchart illustrating processing performed by the service provider.

A description is now given, with reference to the flowchart of FIG. 27, of processing (processing with the STB 11 in the above description) for sending content data by the service provider 2. In step S231, the service provider 2 determines whether there is a query concerning schedules or a request to send content data.

The service provider 2 remains in the standby mode until it determines in step S231 that there is a query or request from another device. When it is determined that there is a query or request from another device, the process proceeds to step S232. It is determined in step S232 whether the query or request from another device is about schedules. If it is determined in step S232 that the query is about schedules, the process proceeds to step S233.

It is determined in step S233 whether a schedule corresponding to the device ID of the device that has queried about schedules has been formed and stored by the scheduler 204. Another device (for example, the STB 11) queries the service provider 2 as to the schedules at regular intervals, and when making a query, the device sends the device ID.

Accordingly, the service provider 2 determines by using the received device ID whether a schedule for the device ID is stored in the scheduler 204. The scheduler 204 stores a plurality of schedules having a data structure, such as that shown in FIG. 22. The service provider 2 checks the "destination device ID" in the data of the schedule to determine whether there is the "destination device ID" which coincides with the received device ID.

If it is determined in step S233 that there is no schedule concerning the received device ID (device), the process returns to step S231, and step S231 and the subsequent steps are repeated. If it is determined in step S233 that there is a schedule concerning the received device ID, the process proceeds to step S234. In step S234, the corresponding schedule is read from the scheduler 204 and is sent to the device that has made a query.

The schedule read in step S234 should be a schedule whose "distribution status" (FIG. 22) indicates that the content data has not been sent. Even if the "distribution status" indicates that the content data has not been sent, the schedule itself may have already been sent. In this case, it is not necessary to send the same schedule again, and thus, such a schedule does not have to be read.

To prevent the same schedule from being re-sent, a flag, for example, indicating whether the schedule has been sent, may be prepared, and this flag may be contained in the schedule shown in FIG. 22 as one item of data, or may be contained in the "distribution status".

Upon completing the sending of the schedule in step S234, the process returns to step S231, and step S231 and the subsequent steps are repeated.

If it is determined in step S232 that the query or request from another device is not about schedules, i.e., that the query or request is about a request to send content data, the process proceeds to step S235. In step S235, the sending of the requested content data is started.

When sending a request to send content data, the device (for example, the STB 11) sends at least information concerning the transaction ID together with the request. By receiving the transaction ID, the service provider 2 can specify which schedule is to be executed among the schedules stored in the scheduler 204.

By specifying the schedule to be executed, the content ID of the content to be sent can be specified. The content data associated with the content ID is read from the content database (FIG. 7) and is sent.

Upon starting sending the content data in step S235, it is reported to the predetermined device at the user side in step S236 that the sending of the content data is started. The predetermined device is a device to which the mail address (FIG. 18) registered in the destination table of the service provider 2 is assigned.

It is determined in step S237 whether the whole content data has been sent, i.e., whether the sending has finished. Step S237 is repeated until it is determined that the sending of the content data has finished. When it is determined that the sending of the content data has finished, the process proceeds to step S238.

When sending content data, license data is also sent. Content data cannot be played back without the license data. For example, when sending content data to the user device, it is encrypted, and data for decrypting the content data is contained in the license data. Accordingly, both the content data and license data must be sent to the user (STB 11). The timing of sending the content data does not have to be the same as that of sending the license data. That is, the content data and license data may be sent simultaneously, or may be sent at different times (differently).

For example, since the data amount of content data is relatively large, it may be sent at a time when transmission lines are not busy, for example, at night, and license data having a relatively small data amount may be sent before or after the time when the content data is sent and before the user views the content data.

In step S238, the "distribution status" information in the data of the schedule shown in FIG. 18 is overwritten by the information indicating that the sending of the content data has finished. Instead of overwriting the information, the corresponding schedule may be deleted. The reason for overwriting the "distribution status" information by the information indicating that the sending of the content data has finished is to perform billing processing. Thus, when billing processing is finished, the corresponding schedule may be deleted.

In step S239, it is reported that the sending of the content data has completed. This report processing may be performed in a manner similar to that of step S236.

As described above, the service provider 2 controls the processing for sending content data. Steps S236 and S239 for report processing are not always necessary. Neither of the steps may be performed, or one of the steps may be executed.

In response to the processing by the service provider 2, processing for receiving content data is described below with reference to the flowchart of FIG. 28. This processing is discussed in the context of the STB 11.

In step S251, the STB 11 determines whether it is time to query the service provider 2 as to schedules. It is set that the STB 11 makes a query at predetermined time intervals, for example, every hour.

It is determined whether it is time to make a query after the lapse of the predetermined time interval. If it is determined in step S251 that it is time to make a query, the device ID is read from the device ID manager 225 (FIG. 8) and is sent to the service provider 2 in step S252. When the device ID is sent, the above-described processing is performed in the service provider 2. When the schedule information is sent as a result of this processing, the schedule is received in step S253.

The received schedule is stored in, for example, the distribution controller 222 (FIG. 8). The schedule stored (sent) includes at least information concerning the transaction ID and the distribution time. In step S254, the distribution controller 222 checks the "distribution time" in the stored schedule to determine whether the distribution time has reached. That is, the STB 11 determines whether it is time to send a request to send content data.

Step S254 is repeated until it is determined that it is time to send a request to send content data, and if it is determined that it is time to send a request to send content data, the process proceeds to step S255. In step S255, the transaction ID is read and is sent to the service provider 2.

As a result of sending the transaction ID, the content data is sent from the service provider 2. In step S256, the content data is received by the STB 11 and is stored.

As discussed above, the STB 11 stores content data for which the purchase processing has been performed by using another device.

The device (in this case, the STB 11) that receives content data can query the service provider 2 as to schedules or can send a request to send content data to the service provider 2. This is because the STB 11 is not always ready to receive schedules or content data.

In other words, the STB 11 is not always powered ON, but it may be powered OFF. If schedules or content data is sent from the service provider 2 when the STB 11 is powered OFF, the STB 11 cannot receive or store the schedules or content data. By considering this, the STB 11 queries about the schedules or sends a request to send content data.

If the STB 11 is always powered ON or if it has a function of receiving content data even when it is powered OFF, the service provider 2 may send a schedule to the STB 11 upon creating the schedule. The content data may also be sent from the service provider 2 when the distribution time has reached without the need for the STB 11 to send a request.

Although in the above-described embodiment the PC 12 performs purchase processing and the content data is downloaded to the STB 11, the cellular telephone 13 may perform purchase processing, in which case, the cellular telephone 13 performs purchase processing in a manner similar to the PC 12.

As described above, purchase processing can be performed in a predetermined device, and another device can store the purchased content data therein. This enables the user to download desired content data to a device at home by using another device when he/she is away. Accordingly, it becomes easier for the user to obtain desired content data.

In the above-described embodiment, basically, the user who purchases content data and the user who enjoys the content data are the same user. In other words, the user paying a fee for the purchased content data (the user to be charged) and the user obtaining the content data are the same user. Also in other words, the device for performing processing for purchasing the content data and the device for storing the purchased content data are owned by the same user.

A description is now given of the case where the user A (FIG. 1) performs processing for purchasing content data and the user B enjoys the content data purchased by the user A by using a device owned by the user B. In other words, the user A gives the content data (license data) to the user B as a present.

As stated above, content data cannot be played back without the license data. For example, content data does not have to be provided via the network 1, and may be recorded on a recording medium, such as a CD (Compact Disc) or a DVD (Digital Versatile Disc), and is given as a present. In this case, license data may be provided via the network 1 to a device playing back such a recording medium. The following processing can also be applied to such a case.

By considering the definition of license data, license data is not always necessary, for example, when content data is distributed free of charge, content data can be played back without license data.

In this sense, there are some cases that license data be preferably given as a present. In the following description, it is indicated that content data is given as a present; however, it actually means that both the content data and license data are offered as a present and that only license data is given as a present.

Processing for offering content data as a present is discussed below, assuming that the user A performs processing for purchasing content data as a present by using the PC 12 and that the user B obtains (stores) the content data offered by the user A in the STB 21 (FIG. 1). In other words, the service provider 2 bills the user A and distributes the content data to the user B.

The overall processing flow (processing flow between the PC 12, the service provider 2, and the STB 21) is basically similar to that indicated by the flowchart shown in FIG. 23. In the flowchart of FIG. 23, the processing performed by the PC is the processing performed by the PC 12 of the user A, and the processing performed by the STB is the processing performed by the STB 21 of the user B.

When performing processing concerning presents, the service provider 2 must perform the corresponding processing. Accordingly, a description is given below of the processing by the service provider 2. A description is first given of, with reference to the flowcharts of FIGS. 29 and 30, content purchase processing including processing concerning presents by the service provider 2.

Figure 24:
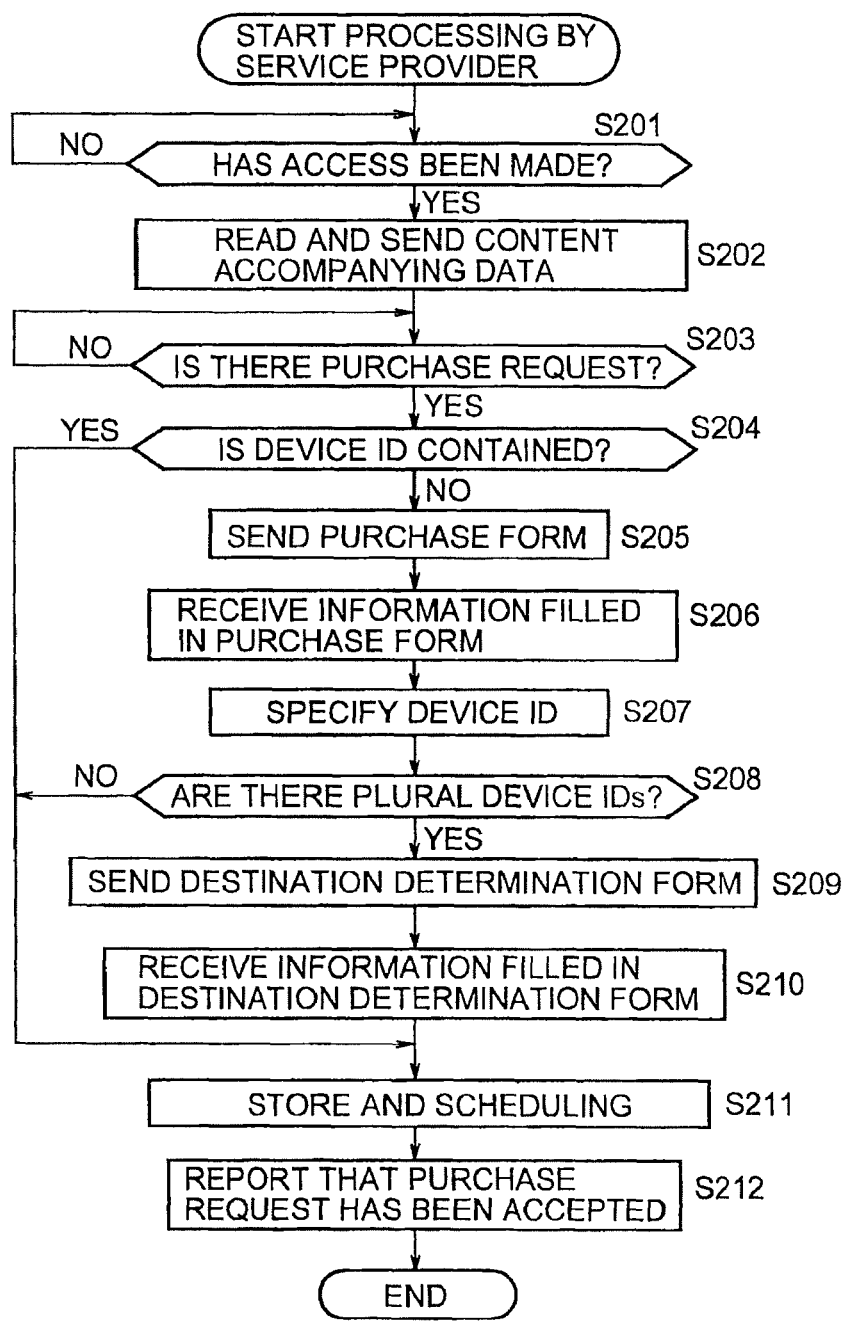
FIG. 24 is a flowchart illustrating processing performed by the service provider.
Figure 29:
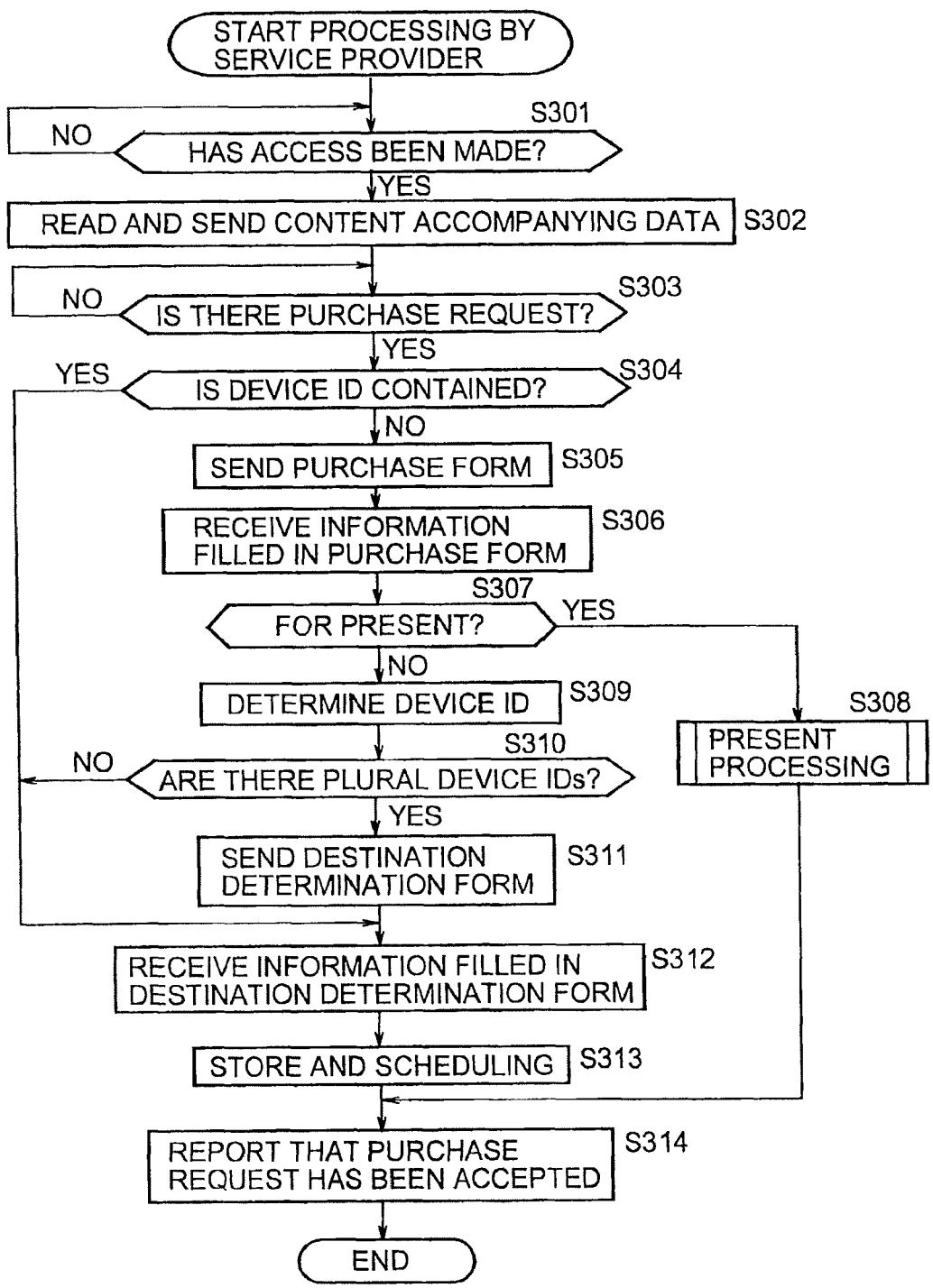
FIG. 29 is a flowchart illustrating processing performed by the service provider.

In the flowchart of FIG. 29, steps S307 and S308 are added to the flowchart of FIG. 24. That is, steps S301 through S306 of the flowchart in FIG. 29 are basically similar to steps S201 through S206 of the flowchart in FIG. 24. Steps S309 through S314 of the flowchart in FIG. 29 are basically similar to steps S207 through S212 of the flowchart in FIG. 24.

Accordingly, only an explanation of executing processing concerning presents is given by omitting a description of the processing by the service provider 2 discussed with reference to the flowchart of FIG. 24. When executing present processing by the service provider 2, purchase form data sent in step S305 is different from that in the above-described embodiment.

In the above-described embodiment, the screen based on the purchase form data is that shown in FIG. 25. When executing present processing, however, purchase form data displayed on a screen, such as that shown in FIG. 31, of the user device (in this case, the display unit 261 of the PC 12 of the user A) is sent in step S305.

On the screen shown in FIG. 31, a column for inputting the user ID, a column for inputting the password, and a radio button for checking when giving an affirmative answer in response to a message "Is it for present?" are provided. When the user wishes to give content data to be purchased to another user as a present, he/she checks the radio button corresponding to the message "Is it for present?". FIG. 31 illustrates the state in which the radio button has been checked.

When sending purchase form data for displaying such a screen on the display unit 261 of the user, the service provider 2 enters in the standby mode to wait for information input by the user by referring to the purchase form. Upon receiving the information filled in the purchase form in step S306, the process proceeds to step S307.

The received information contains at least the user ID and password, and may contain information indicating that the content data to be purchased is for a present. The processing of step S307 is performed by using the information indicating whether the content data to be purchased is for a present.

If it is determined in step S307 that the content data to be purchased is for a present (such information is contained), the process proceeds to step S308. If it is determined in step S307 that the content to be purchased is not for a present (such information is not contained), the process proceeds to step S309.

When the process proceeds to step S309, that is, when the content data to be purchased is not for a present, the subsequent process is performed similarly to that shown in FIG. 24.

When the process proceeds to step S308, present processing is performed. Before explaining the processing of step S308, the handling of the user ID and password of the information received in step S306 is discussed below.

When the process proceeds to step S309, as discussed with reference to the flowchart of FIG. 24, the user ID and password are used for specifying the device for receiving the purchased content data and for conducting user authentication. When the process proceeds to step S308, the user ID and password are used for specifying the user to be charged, which is described below.

The present processing in step S308 is described below with reference to the flowchart of FIG. 30. In step S321, data concerning a present form is sent. An example of the screen displayed on the user device, in this case, on the display unit 261 of the PC 12 of the user A, by performing processing based on the present form data is shown in FIG. 32.

On the screen shown in FIG. 32, a column for inputting the mail address of the user to receive the present and a column for inputting the time and date when the user wishes to deliver the present are provided. The reason for inputting the mail address of the user to receive the present is to specify the user (device) for receiving the content data as a present.

The reason for inputting the time and date when the user wishes to deliver the present is to respond to a user's desire to supply the content data as a specific date, for example, a birthday. The input of the time and date for delivering the present is not essential, and even if the user does not input the time and date, the subsequent processing is performed.

Although the mail address is used for specifying the user to deliver the present, another information may be used. A description has been given, assuming that the information shown in FIG. 18 is contained in the destination table, and among such items of information, the mail address seems to be most suitable for specifying the user to deliver the present. Thus, the mail address is used by way of example.

When it is controlled that the same user ID is not present in the destination table, as in this embodiment, the user to receive the present can be uniquely determined by the user ID. Accordingly, the user ID can be used as the information for specifying the user to receive the present. In this case, in the screen shown in FIG. 32, instead of the mail address, the user ID of the user to receive the present can be input.

If the user's real name, telephone number, and address are contained in the destination table (or another table in the service provider 2), such information may be used for specifying the user to receive the present. Alternatively, the user can be specified by a combination of the above-described items of information.

The information input by the user to give the content data as a present by referring to the screen shown in FIG. 32 is received by the service provider 2 in step S322. The service provider 2 extracts the mail address contained in the information received in step S322. In step S323, it is determined whether the extracted mail address is stored (registered) in the destination table (for example, the destination table shown in FIG. 18).

If it is determined in step S323 that the extracted mail address is registered in the destination table, the process proceeds to step S324. If it is determined that the extracted mail address is not registered, the present processing based on the flowchart of FIG. 30 is terminated. If the extracted mail address is not registered in the destination table, the device (user) to receive the content data as a present cannot be specified. Thus, if it is determined that the mail address is not registered, present processing is terminated.

If it is determined that the extracted mail address is not registered in the destination table, processing for instructing the user to re-input the mail address may be performed. If the present processing is terminated because the destination cannot be specified, a message indicating that the purchase processing has failed may be sent to the user device of the user who has sent a request to purchase the content data in step S314 (FIG. 29).

If it is determined in step S323 that the extracted mail address is registered in the destination table, the process proceeds to step S324. In step S324, mail is sent to the extracted mail address. It is assumed that the extracted mail address is "ΔXΔ@x.co.jp". The destination table shown in FIG. 18 shows that this mail address is the mail address of the user having a user ID "KAKIKU".

When the extracted mail address coincides with the mail address indicated in the destination table, the outcome of step S323 is YES, and the process proceeds to step S324. When the result of step S323 is determined to be YES, the information indicated in the same entry of the mail address is also read if necessary. In this case, at least information "personal computer", "STB", and "cellular telephone" indicated in the terminal name are read. The read information is contained in the mail and is sent.

The content of the mail is as shown in FIG. 33. It is now assumed that the mail is received by the PC 22 of the user B and the content (screen) shown in FIG. 33 is displayed on a display unit 301 of the PC 22.

On the screen shown in FIG. 33, a message "You have content present from user A". Do you wish to accept it?" is displayed. In the "user A" in this message, the user ID or the name of the user A registered before (which is managed as one item of information in the destination table in association with another item information) is displayed. When sending mail for displaying such a screen, the service provider 2 specifies the user who has offered the present from the user ID (or the password or the user ID and the password) of the user, and forms a mail message so that the character string indicating the specified user can be displayed in the "user A" in the above-described message.

On the screen shown in FIG. 33, radio buttons for responding to the message "Do you wish to accept the present?" are provided; one is for "YES", and the other one is for "NO". When the radio button corresponding to "YES" is checked, radio buttons for responding to the message "Please select the device by which you wish to receive the present" becomes effective.

In the example shown in FIG. 33, radio buttons for three terminal names "personal computer", "STB", and "cellular telephone" are provided. If the user to receive the present has registered only one device (terminal), only one terminal name is displayed in the portion in which the terminal name is indicated. If only one terminal name is displayed, the device corresponding to the terminal name has to be specified as the destination for the content data. That is, since there is no choice for the device, the terminal name does not have to be displayed or selected. Accordingly, if only one terminal name is to be displayed, it is not necessary to be displayed.

The information input by the user to receive the present by referring to the screen shown in FIG. 33 is sent to the service provider 2. The service provider 2 determines in step S325 whether information from the user to receive the present has been received. If it is determined that the information has been received, the process proceeds to step S326.

In step S326, the service provider 2 extracts the user's response for the query "Do you wish to accept the present?" contained in the received information, and determines whether the extracted response is "YES". That is, it is determined in step S326 whether the user to receive the present has decided to accept the present.

Figure 30:
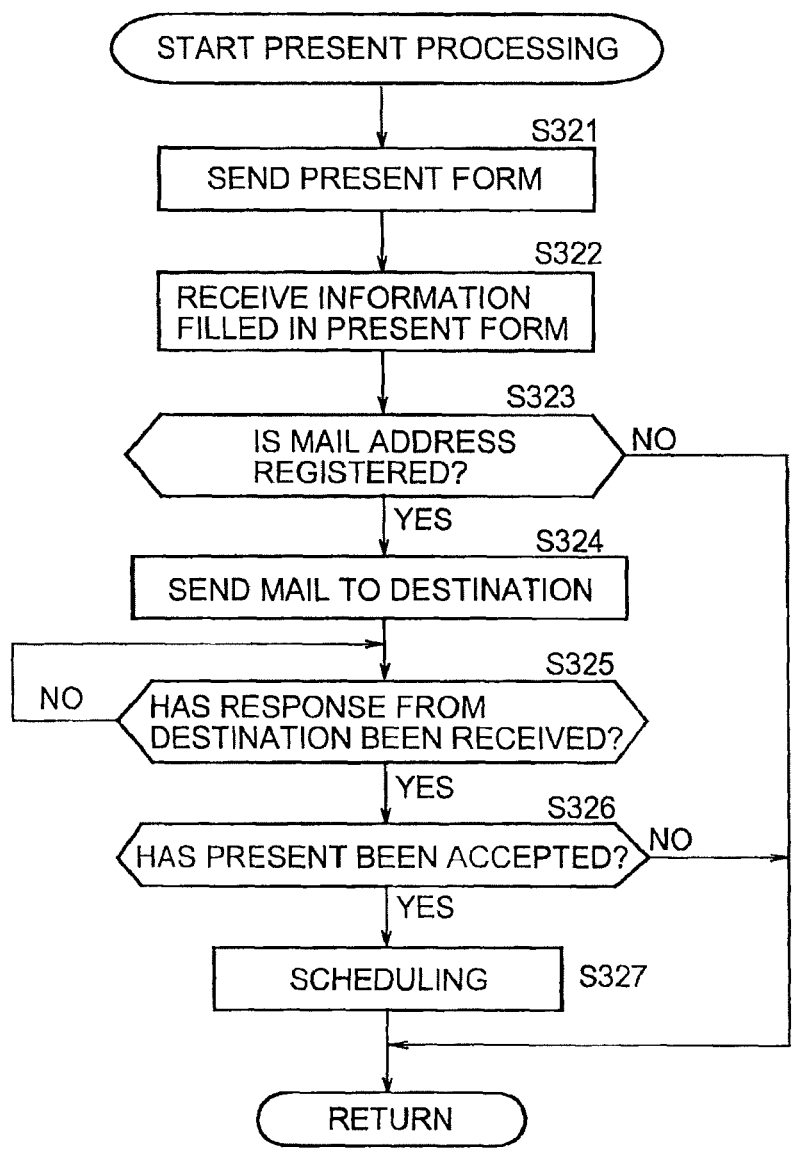
FIG. 30 is a flowchart illustrating present processing.

If it is determined in step S326 that the user to receive the present has decided not to accept the present, the present processing does not have to be executed, and thus, the processing based on the flowchart in FIG. 30 is terminated. When the user to receive the present (in this case, the user B) has refused to accept the present, a message indicating such information may be sent to the user who has offered the present (in this case, the user A) by email.

If it is determined in step S326 that the user to receive the present has decided to accept the present, the process proceeds to step S327. In step S327, a schedule is formed to distribute the content data to the destination as a present. The schedule to be formed is basically similar to that shown in FIG. 22.

Details of the schedule formed in step S327 are given below with reference to FIG. 22, assuming that a present is given from the user A to the user B. In the "content ID", the ID of the content specified by the user A as a present for the user B is indicated. In the "destination device ID", the device ID corresponding to the device (terminal name) specified by the user B and received in step S325 is indicated.

In the "billing user ID", the user ID of the user A offering the present is indicated. In the "distribution time", the time designated by the user A as the time to deliver the present to the user B is basically indicated. The reason for indicating "basically" is that there is a possibility of the service provider 2 writing (setting) a time other than the designated time in the subsequent scheduling processing.

After creating such a schedule, the process proceeds to step S314 (FIG. 29). In step S314, it is reported that the purchase request has been accepted. When the present processing has been executed and the user to receive the present has decided to accept the present, the above-described report is sent to the user to receive the present and the user to offer the present.

When the user to receive the present has decided not to accept the present after executing the present processing, it is reported to the user that the present processing has been terminated, and it is reported to the user to offer the present that the present has been refused.

When the present processing is not executed, i.e., when it is determined in step S307 that the content data is not for a present, the subsequent processing is performed. In this case, processing similar to step S212 of the flowchart in FIG. 24 is performed.

The purchase processing including the present processing has been performed by the service provider 2. A description is now given of the processing for distributing content data by the service provider 2. The processing for distributing content data by the service provider 2 is basically similar to that of the flowchart in FIG. 27, and an explanation thereof is thus omitted. In this case, however, the processing is performed between the service provider 2 and the user device to receive a present, for example, the STB 21.

When the content data is distributed as a present, a distribution completion report in step S239 may preferably be given not only to the user who has received the present, but also to the user who has offered the present. By sending a report to the user who has offered the present, it is possible to inform the user that the present has been sent and the user is to be billed for it.

Figure 28:
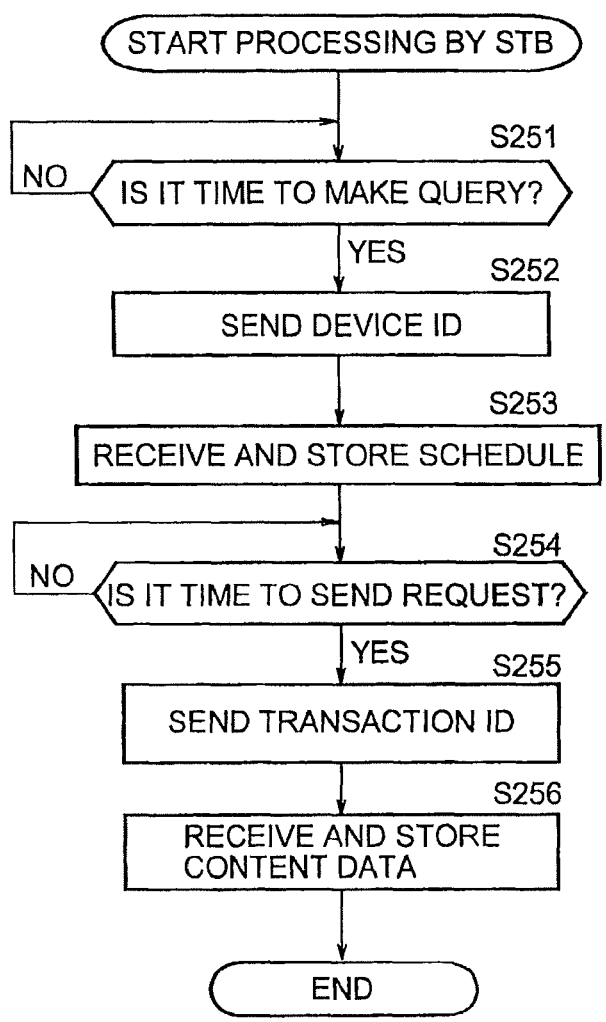
FIG. 28 is a flowchart illustrating processing performed by the STB.

The device to receive a present (in this case, for example, the STB 21 of the user B) performs the processing indicated by the flowchart of FIG. 28. That is, regardless of whether the user B receives content data purchased by himself/herself or receives content data offered by the user A as a present, processing is similarly performed.

Accordingly, in this embodiment, content data (license data) can be offered to another user as a present.

Scheduling performed by the service provider 2 is described below. The scheduling is performed, for example, in step S313 (FIG. 29), when an instruction is given to purchase a new item of content.

The situations in which scheduling is performed is checked. In one situation, the user A performs purchase processing by using a device owned by the user A, and stores content data in the same device used for purchase processing. In another situation, the user A performs purchase processing by using a device owned by the user A, and stores content data in a device different from the device used for purchase processing.

In another situation, the user A performs purchase processing by using a device owned by the user A, and stores content data in a device owned by the user B different from the user A.

In this manner, there are several relationships between the device for performing purchase processing and the device storing the purchased content data. The content data may be distributed at the time designated by the user or set by the service provider 2.

The data amount of content data to be distributed is not uniform, and some data may be sent in a short time, and for other data, it takes a long time to send.

By considering such various situations, the timing of sending content data must be determined. The processing for determining the timing of sending data is to perform scheduling.

Figure 34:
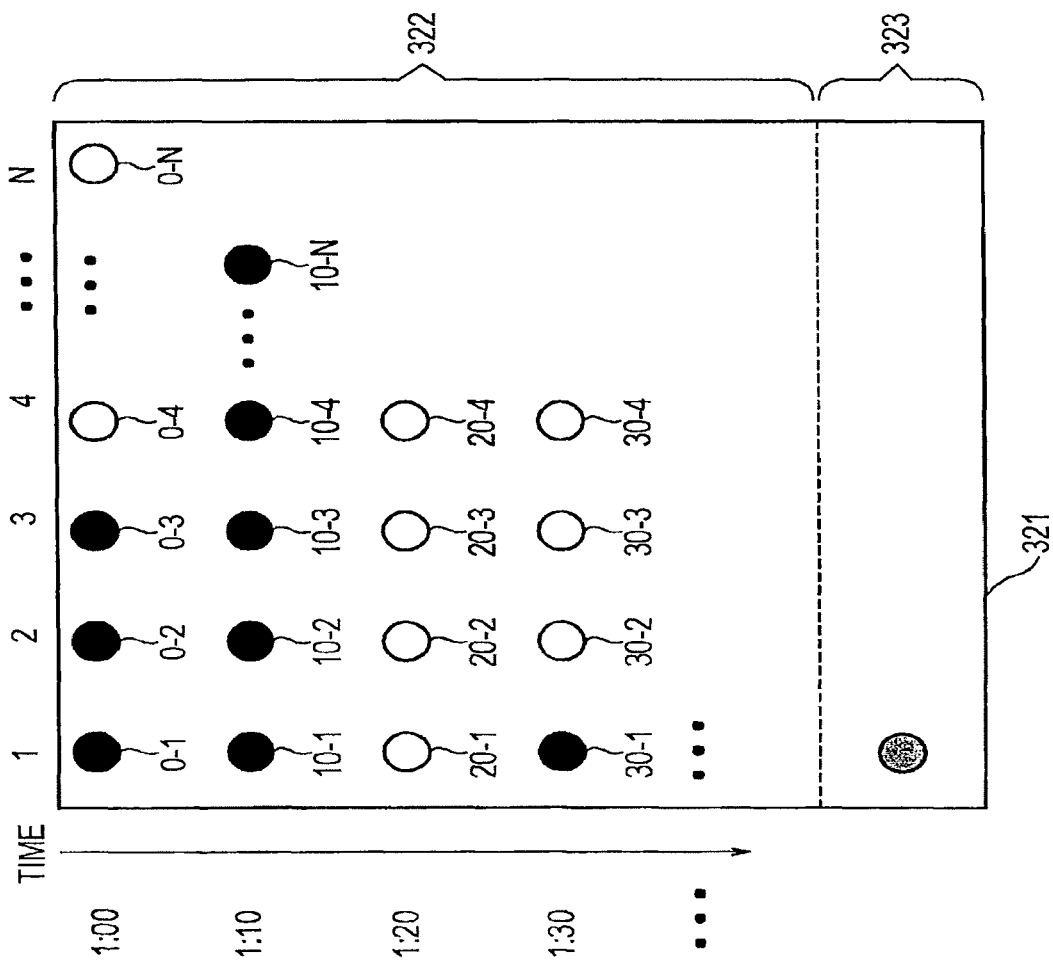
FIG. 34 illustrates a distribution reservation table for reserving schedules.

Before describing scheduling performed by the scheduler 204 (FIG. 7) of the service provider 2 with reference to the flowchart of FIG. 35, a table to be checked when performing scheduling is discussed with reference to FIG. 34. FIG. 34 illustrates a table to be checked when forming a schedule by the scheduler 204, and this table shows the reservation times when predetermined items of content are to be distributed.

In a distribution reservation table 321, reservations can be made every ten minutes, and time spans at 1:00, 1:10, 1:20, and 1:30 are enlarged. In FIG. 34, black dots indicate that reservations have been made, and white dots indicate that no reservations are made (free).

FIG. 34 illustrates that N reservations can be made from 0 to 10 minutes. A specific number N is determined by the data amount of content data to be distributed and the data amount (transmission capacity) by which the service provider 2 can distribute for 10 minutes. However, since the transmission capacity (processing capacity) is constant, the number N is basically determined by the data amount of content data.

Accordingly, when many items of content data having a larger amount of data are sent, the number N becomes smaller, and when many items of content data having a smaller amount of data is sent, the number N becomes larger. Thus, N varies according to the time spans. N is determined by considering the amount of content data that have already been reserved.

The distribution reservation table 321 includes a defined portion 322 and an undefined portion 323. In the defined portion 322, the number of reservations that have been determined as schedules is indicated. In the undefined portion 323, the number of reservations that cannot be determined as schedules since requests for presents have not been accepted by the users is indicated.

Figure 35:
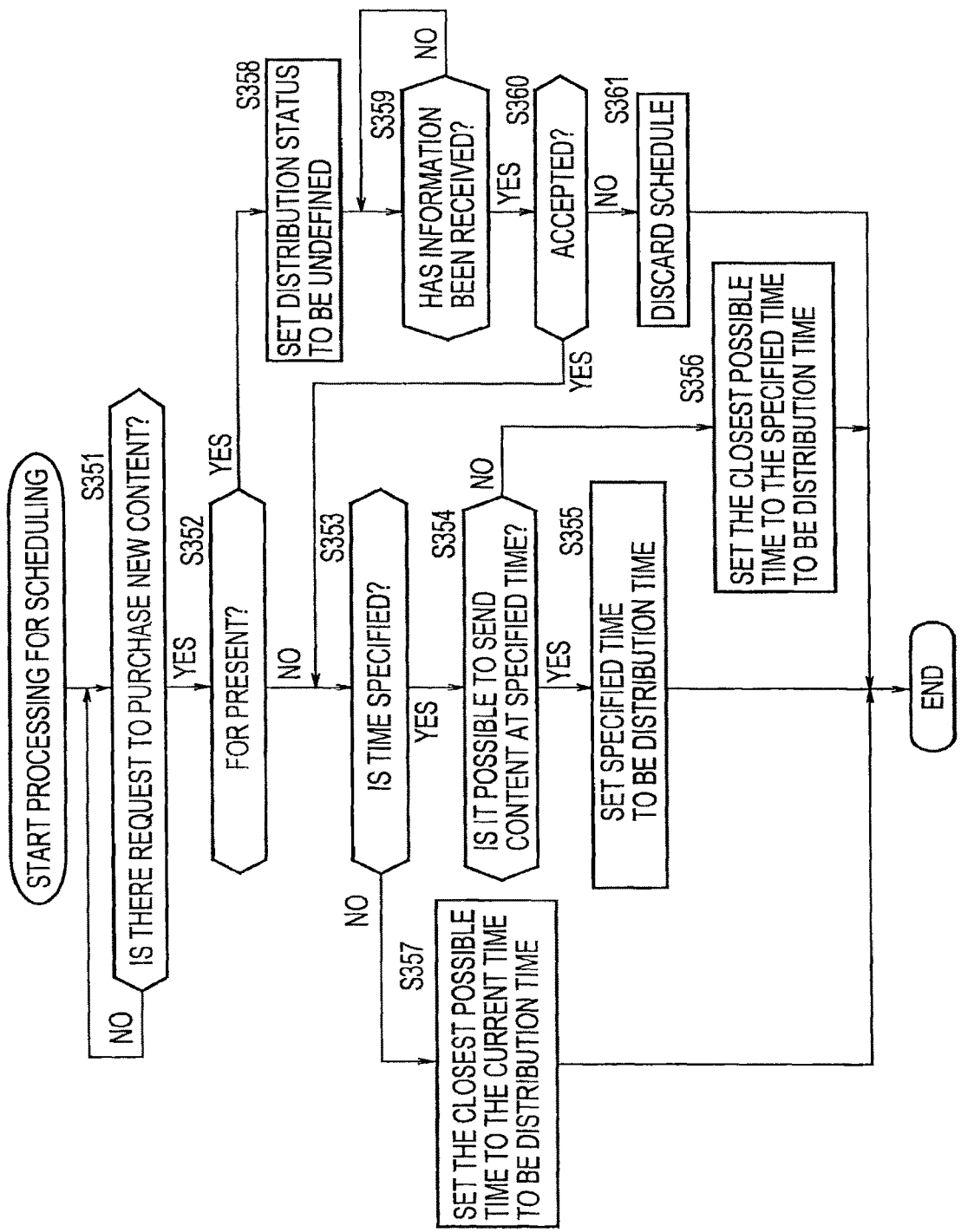
FIG. 35 is a flowchart illustrating scheduling.

The scheduler 204 performs scheduling based on the flowchart of FIG. 35 by referring to the distribution reservation table 321 shown in FIG. 34. The processing for determining the distribution time is described below with reference to the flowchart of FIG. 35 without explaining processing for obtaining other information. The other information has already been obtained and written as stated above.

In step S351, the scheduler 204 determines whether a request to purchase a new item of content has been made and whether it is necessary to form a schedule for distributing the content.

As discussed above, the processing for purchasing content is performed by the content-distribution reservation unit 201. When determining that a content reservation has been made (for example, step S211 of FIG. 24 is performed), the content-distribution reservation unit 201 instructs the scheduler 204 to form a new schedule. The scheduler 204 makes a determination in step S351 by determining whether the above instruction has been given.

If it is determined in step S351 that a new schedule is to be formed, the process proceeds to step S352. In step S352, it is determined whether a schedule to be formed is a schedule concerning a present. The reason for making the determination in step S352 is that a schedule concerning a present (specially, the time to distribute the content data) cannot be determined before the user to receive the present decides to accept the present.

If it is determined in step S352 that the schedule to be formed is not a schedule concerning a present, it is determined in step S353 whether the time to distribute the content data to be purchased is designated by the user. If it is determined in step S353 that the time to distribute the content data is designated, the process proceeds to step S354. In step S354, it is determined whether it is possible to distribute the content data at the designated time.

This determination can be made by referring to the distribution reservation table 321 shown in FIG. 34. For example, when checking the time span at 1:00, N reservations can be made at 1:00. Reservations have already been made in 0-1 through 0-3, while there is no reservation in 0-4 and 0-N. If the content data distribution time is designated at 1:00 by the user, a reservation can be made in 0-4. Thus, it can be determined that content data can be distributed at the time designated by the user.

When checking, for example, the time span at 1:10, N (different from the number N at 1:00) reservations can be made for the time span at 1:10. Reservations have already been made in 10-1 through 10-N. That is, no reservations can be made at 1:10. If the content data distribution time is designated at 1:10 by the user, no reservations can be made. Thus, it can be determined that it is not possible to distribute the content data at the time designated by the user.

In this manner, if it is determined in step S354 that the content data can be distributed at the time designated by the user, the process proceeds to step S355. In step S355, the designated time is set to be the content data distribution time. That is, the time specified by the user is written into the "distribution time" in FIG. 22. In this case, information "not distributed" is written into the "distribution status".

When the user designates the content data distribution time and when it is determined that content data can be distributed at the time designated by the user, a schedule with the designated time is formed.

If it is determined in step S354 that the content data cannot be distributed at the time designated by the user, the process proceeds to step S356. In step S356, the time closest to the designated time by the user and at which the content data can be distributed is searched for by checking the distribution reservation table 321.

Reference is again made to FIG. 34. If the time designated by the user is 1:10, the time span at 1:10 is fully reserved, and thus, it is determined that content data cannot be distributed at 1:10 designated by the user. In this case, the time before or after the designated time is checked. It necessary to preset whether to first search the time before or after the designated time, and basically, it is not important which is searched first.

When the time before the designated time is searched first, the time to be searched (time A) is compared with the time when search is conducted (current time), and unless the time A is after the current time, the time A is not searched. For example, if the designated time is 1:10, the time before the designated time (i.e., time A) is 1:00, and if the time when search is conducted (i.e., the current time) is, for example, 1:05, content data cannot be distributed (reserved) at time A.

In step S356, by checking the distribution reservation table 321, and the time closest to the designated time by the user and at which the content data can be distributed is set to be the distribution time. Then, the set time is written into the "distribution time" of the schedule (FIG. 22).

As described above, when the user specifies the content data distribution time and when it is determined that the content data cannot be distributed at the designated time, a schedule in which the time closest to the designated time and at which the content data can be distributed is formed.

The above-described processing is executed when the user has designated the time. If it is determined in step S353 that the user has not designated the content data distribution time, the process proceeds to step S357. In step S357, the time (basically after the current time) closest to the time (current time) when the schedule is formed and at which the content data can be distributed is set to be the distribution time.

As discussed above, when the user has not specified the content data distribution time, the scheduler 204 forms a schedule with the time when the content data can be distributed.

If it is determined in step S352 that a new schedule to be formed is a schedule concerning a present, the process proceeds to step S358. In step S358, the scheduler 204 forms a schedule in which the information "distribution status" in FIG. 22 is set to be "undefined", i.e., it is not determined whether to distribute the content data.

In this case, the date (time) designated by the user as the time and date at which the user delivers the content data as a present is written into the information "distribution time" of the schedule shown in FIG. 22. Such a schedule is counted as one reservation in the undefined portion 323 of the destination reservation table 321.

The reservation cannot be defined as a schedule even though the time when the content data is distributed is designated. This is because information indicating whether the user to receive the present has decided to accept the present has not been received. It is then determined in step S359 whether information indicating whether the user has decided to accept the present has been received. This processing is similar to the processing in step S325 of the flowchart in FIG. 30.

Step S359 is performed by determining whether the scheduler 204 has received information concerning a response from the user to receive the present. If it is determined in step S359 that information has been received, the process proceeds to step S360.

It is determined in step S360 whether the received information indicates that the present is to be received (accepted). If the information is found to indicate that the present is to be accepted, the process proceeds to step S353 and the step S353 and the subsequent steps are performed. Step S353 and the subsequent steps have been discussed, and an explanation thereof is omitted, except for processing for a schedule concerning a present.

It is determined in step S353 by referring to undefined schedules whether the time has been designated. That is, even undefined schedules have already been formed as schedules, such as those shown in FIG. 22, and the "distribution time" is checked to perform step S353.

If a predetermined time is written as the information "distribution time", the process proceeds to step S354. In step S354, the time written in the "distribution time" is compared with the current time, and if the written time is after the current time and if the content data can be distributed at the written time, the process proceeds to step S355.

If it is determined in step S354, as a result of comparing the written time with the current time, that the written time is before the current time, the written time has already elapsed. That is, the time designated as the time to deliver the present has already elapsed.

In this case, the process proceeds to step S356. In step S356, the earliest possible time is preferably set to be the distribution time rather than the time closest to the designated time and at which the content data can be distributed.

When the "distribution time" in the schedule is set and written, information indicating the "distribution status" is also changed from "undefined" to "not yet distributed". Also, the number of reservations written into the undefined portion 323 of the distribution table 321 is decremented by one, and the number of reservations corresponding to the set time in the defined portion 323 is incremented by one.

A schedule concerning a present can be formed, as described above.

If it is determined in step S360 that information from the user to receive the present indicates that the user does not accept the present, the process proceeds to step S361. In step S361, the undefined schedule for the content refused is discarded. In this processing, the number of reservations in the undefined portion 323 of the destination reservation table 321 is decremented by one.

The schedule formed as described above is provided to the STB 11 in response to queries from the STB 11 at predetermined time intervals as to whether a new schedule has not been formed for the STB 11. The STB 11 sends a request to distribute content data based on the provided schedule, and the request is sent after the time when the schedule has been received.

Because of this time lag, it is necessary to consider the possibility that the situation of the STB 11 has changed from the time when it has received the schedule to the time when the STB 11 sends a request to distribute content data.

More specifically, the STB 11 is provided with the storage unit 85 (FIG. 3) having a limited capacity, and content data is stored in this storage unit 85. Even if the storage unit 85 has a capacity for storing the content data to be distributed when the schedule has been received, the capacity of the storage unit 85 may become short because another content data is received and stored before sending a request to distribute the content data.

In this manner, even if the STB 11 sends a request to distribute content data based on a schedule and receives the content data, the capacity of the storage unit 85 may not be enough for storing the content data. If such a situation occurs in the STB 11, it is necessary that the service provider 2 perform processing for re-sending the content data.

Processing for sending content data by the service provider 2 by considering such a situation is described below with reference to the flowchart of FIG. 36.

Figure 36:
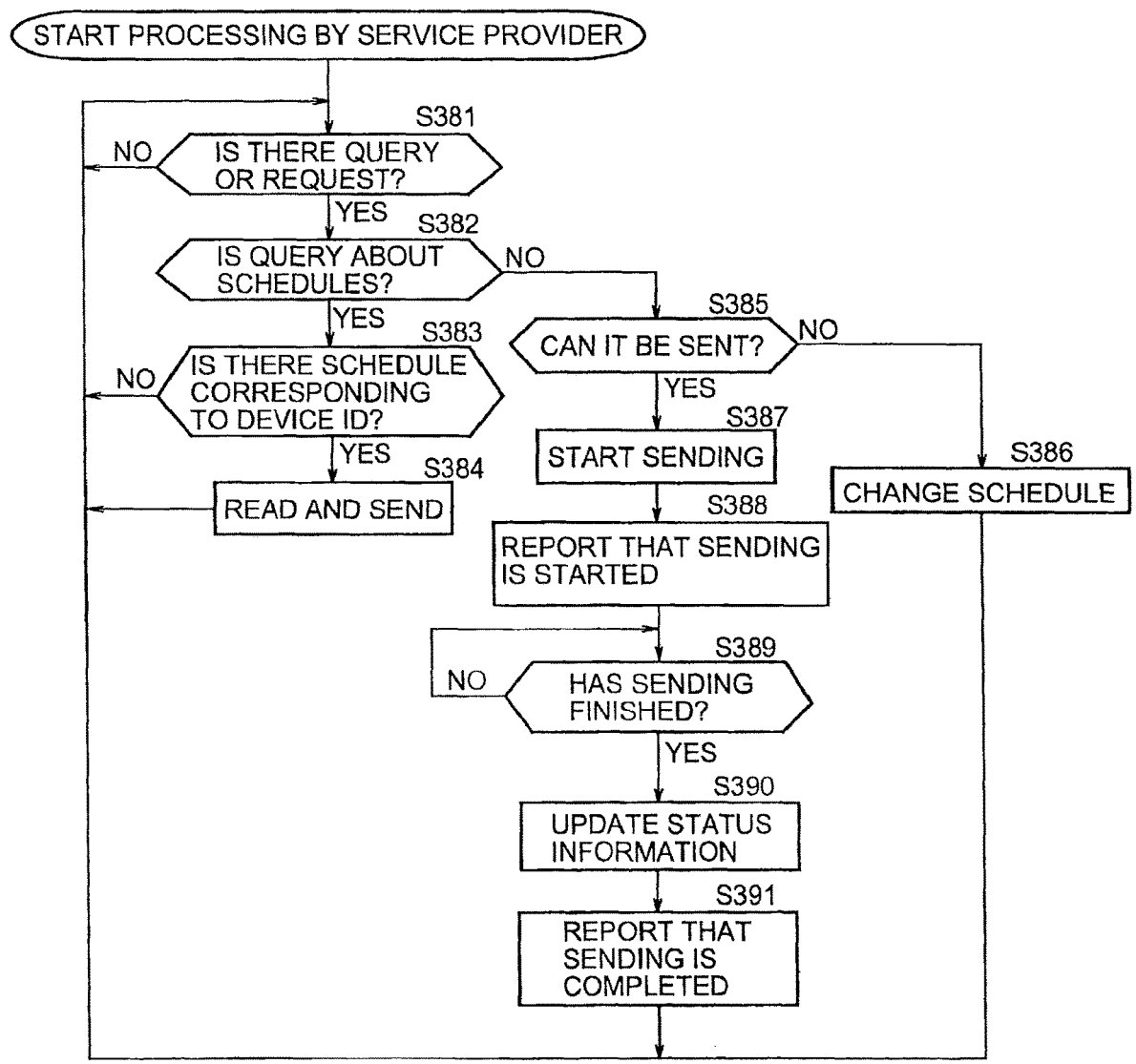
FIG. 36 is a flowchart illustrating processing performed by the service provider.

In the flowchart of FIG. 36, steps S385 and S386 are added to the flowchart of FIG. 27. That is, steps S381 through S384 and steps S387 through S391 of the flowchart in FIG. 36 are similar to steps S231 through S234 and S235 through S239 of the flowchart in FIG. 27, and an explanation thereof is thus omitted.

Step S385 is performed when it is determined that the STB 11 (by way of example) has sent a request to distribute content data. In step S385, when distributing the requested content data, it is determined whether the device for receiving the content data can reliably store the content data. The information for making this determination must be sent from the STB 11.

When sending a request to distribute content data, the STB 11 sends information concerning the remaining capacity of the storage unit 85 to the service provider 2. The service provider 2 compares the remaining capacity of the storage unit 85 with the size of the requested content data, and only when the remaining capacity of the storage unit is greater than the size of the content data, the process proceeds to step S387, and step S387 and the subsequent steps, i.e., processing for distributing the content data, are executed.

Alternatively, when sending a request to distribute content data, the STB 11 compares the remaining capacity of the storage unit 85 with the size of the content data to request (the STB 11 can obtain this information by referring to the information concerning the schedule received in step S253 of FIG. 28), and sends information indicating whether there is a capacity for storing the content data in the storage unit 85 to the service provider 2.

The service provider 2 receives either of the information indicating that the content data can be received or the information indicating that the content data cannot be received. By using such information, the service provider 2 may perform step S385.

In any case, the service provider 2 does not execute step S387 unless it determines that the STB 11 can store the content data to be received. Accordingly, it is possible to prevent a situation in which the STB 11 cannot store received content data.

When it is determined in step S385 that it is not possible to send requested content data, the process proceeds to step S386. In step S386, the schedule is changed. That is, in step S386, it is understood that content data to be distributed cannot be sent, and that it should be distributed another time.

Accordingly, the "distribution time" of the schedule has to be rewritten (changed). The "distribution time" may be rewritten so that the content data is re-sent after the lapse of a predetermined time, for example, after one hour. In this case, details in the distribution reservation table 321 are also rewritten, and the number of reservations at the changed time is incremented by one.

Alternatively, the service provider 2 may send mail to the user to instruct him/her to change the distribution time, and may change the schedule based on a response from the user. In this case, the "distribution status" of the corresponding schedule is changed to "not defined" until a response from the user is received. Accordingly, the number of reservations of the undefined portion 322 of the distribution reservation table 321 is incremented by one. Then, when receiving a response, the "distribution time" in the schedule is changed to the time indicated in the response, and the number of reservations at the changed time in the distribution reservation table 321 is incremented by one.

When the schedule is rewritten, the rewritten schedule is re-sent to the STB 11, and the STB 11 performs processing based on the rewritten schedule. The content data is then sent and received.

Alternatively, when the STB 11 becomes ready to store the content data, it may re-send a request to distribute the content data. In this case, the service provider 2 maintains the "distribution status" in the corresponding schedule to be "not distributed" without deleting the schedule.

As discussed above, by sending required information from the STB 11 and by performing corresponding processing by the service provider 2, it is possible to prevent a situation in which content data received by the STB 11 cannot be stored. Thus, the service provider 2 does not perform processing for distributing content data in vain.

In the above-described embodiment, processing for purchasing one item of content is described by way of example. However, processing for purchasing a plurality of items of content data at the same time can be performed, and a plurality of items of content data can be sent and received at the same time.

The above-described series of processing may be executed by hardware having the corresponding functions or by software. If software is used to execute the series of processing, the software program is installed from a recording medium into a computer built in dedicated hardware or a computer, such as a general-purpose computer, that can execute various functions by installing various programs thereinto.

The recording medium may be a package medium, for example, the magnetic disk 61 (including flexible disk), the optical disc 62 (including CD-ROM (Compact Disc-Read Only Memory) and DVD (Digital Versatile Disc))), the magneto-optical disk 63 (including MD (Mini-Disc) (registered)), or the semiconductor memory 64, which is distributed for providing the program to the user, separately from the personal computer, such as the service provider 2. The recording medium may also be formed of the ROM 42 or a hard disk containing the storage unit 48 storing the program therein, which is provided to the user while being integrated in a computer.

In this specification, the steps forming the program provided by the medium may be executed in chronological order as described in the specification. Alternatively, the steps may be executed concurrently or individually.

In this specification, the system is the entire apparatus formed of a plurality of devices.

INDUSTRIAL APPLICABILITY

According to the present invention, content data can be supplied to user devices.

According to the present invention, the device used for performing processing for purchasing content data and the device for storing the purchased content data can be different. Thus, the user can perform purchase processing in a desired device, and can store the purchased content data in a device that can easily play back the content data.

The invention claimed is:

1. A device for purchasing music or video content data to be stored on a different first apparatus, the device comprising:
   circuitry configured to
      send a request to an information process apparatus, the sent request being a request to purchase the content data to be stored on the first apparatus;
      receive, in response to the sent request, a plurality of content IDs from the information process apparatus;
      receive, from the information process apparatus, a destination determination form comprising a plurality of device IDs associated with a plurality of apparatuses, including the first apparatus, configured to store the purchased content data;
      send, based on a selection of a device ID associated with the first apparatus on the destination determination form, (i) a content selected from among the plurality of content IDs for purchasing and (ii) a first user ID of the first apparatus to the information process apparatus, the first user ID having been previously registered in a destination database of the information process apparatus as authorizing content delivery to one or more apparatuses including the first apparatus; and
      receive, from the information process apparatus, an indication of a distribution of the purchased content data to the first apparatus, wherein
   the content ID identifies the content data, is distinct from any license permitting playback of the content data corresponding to the content ID, and is associated with a license ID configured to identify a plurality of usage conditions the content ID is subject to.

2. The device according to claim 1, wherein the content data includes a content ID, a size of the content data, a fee for purchasing the content data, and details of content provided by the content ata.

3. The device according to claim 1, wherein the first user ID is an email address of the first user.

4. The device according to claim 1, wherein the circuitry is further configured to receive the destination determination request form from the information process apparatus when the first user ID is associated with multiple apparatuses.

5. The device according to claim 1, wherein the circuitry is further configured to designate a distribution time for the distribution of the purchased content to the first apparatus.

6. An information processing method implemented by a device for purchasing music or video content data to be stored on a different first apparatus, the method comprising:
   sending a request to an information process apparatus from the device, the sent request being a request to purchase the content data to be stored on the first apparatus;
   receiving, in response to the sent request, a plurality of content IDs from the information process apparatus;
   receiving from the information process apparatus, a destination determination form comprising a plurality of device IDs associated with a plurality of apparatuses, including the first apparatus, configured to store the purchased content data;
   sending, based on a selection of a device ID associated with the first apparatus on the destination determination form, (i) a content ID selected from among the plurality of content IDs for purchasing and (ii) a first user ID of the first apparatus to the information process apparatus, the first user ID having been previously registered in a destination database of the information process apparatus as authorizing content delivery to one or more apparatuses including the first apparatus; and
   receiving, from the information process apparatus, an indication of a distribution of the purchased content data to the first apparatus, wherein
   the content ID identifies the content data, is distinct from any license permitting playback of the content data corresponding to the content ID, and is associated with a license ID configured to identify a plurality of usage conditions the content ID is subject to.

7. The information processing method according to claim 6, wherein the content data includes a content ID, a size of the content data, a fee for purchasing the content data, and details of content provided by the content data.

8. The information processing method according to claim 6, wherein the first user ID is an email address of the first user.

9. The information processing method according to claim 6, further comprising: receiving the destermination request form from the information process apparatus when the first user ID is associated with multiple apparatuses.

10. The information processing method according to claim 6, further comprising:
designating a distribution time for the distribution of the purchased content to the first apparatus.

11. A non-transitory computer readable medium having stored thereon a program that when executed by a computer causes the computer to implement an information processing method for purchasing music or video content data to be stored on a different first apparatus, comprising:
sending a request to an information process apparatus, the request being a request to purchase the content data to be stored on the first apparatus;
receiving, in response to the sent request, of a plurality of content IDs from the information process apparatus;
receiving from the information process apparatus, a destination determination form comprising a plurality of device IDs associated with a plurality of apparatuses, including the first apparatus, configured to store the purchased content data;
sending, based on a selection of a device ID associated with the first apparatus on the destination determination form, of (i) a content ID selected from among the plurality of content IDs for purchasing and (ii) a first user ID of the first apparatus to the information process apparatus, the first user ID having been previously registered in a destination database of the information process apparatus as authorizing content delivery to one or more apparatuses including the first apparatus; and
receiving, from the information processing apparatus, an indication of a distribution of the purchased content to the first apparatus, wherein
the content ID identifies the content data, is distinct from any license permitting playback of the content data corresponding to the content ID; and is associated with a license ID configured to identify a plurality of usage conditions the content ID is subject to.

12. The non-transitory computer readable medium according to claim 11, wherein the content data includes a content ID, a size of the content data, a fee for purchasing the content data, and details of content provided by the content data.

13. The non-transitory computer readable medium according to claim 11, wherein the first user ID is an email address of the first user.

14. The non-transitory computer readable medium according to claim 11, wherein the method further comprises:
receiving the destination determination request form from the information process apparatus when the first user ID is associated with multiple apparatuses.

15. The non-transitory computer readable medium according to claim 11, wherein the method further comprises:
designating a distribution time for the distribution of the purchased content to the first apparatus.

* * * * *